(12) United States Patent
Ueda et al.

(10) Patent No.: US 12,286,123 B2
(45) Date of Patent: Apr. 29, 2025

(54) ESTIMATION DEVICE

(71) Applicant: DENSO CORPORATION, Kariya (JP)

(72) Inventors: Kensuke Ueda, Kariya (JP); Takuto Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 200 days.

(21) Appl. No.: 17/994,460

(22) Filed: Nov. 28, 2022

(65) Prior Publication Data

US 2023/0092314 A1    Mar. 23, 2023

Related U.S. Application Data

(63) Continuation of application No. PCT/JP2021/014703, filed on Apr. 7, 2021.

(30) Foreign Application Priority Data

May 27, 2020   (JP) .................. 2020-092373

(51) Int. Cl.
| | |
|---|---|
| *B60W 40/10* | (2012.01) |
| *B60L 3/10* | (2006.01) |
| *B60L 15/20* | (2006.01) |
| *B60W 10/08* | (2006.01) |
| *B60W 10/18* | (2012.01) |
| *B60W 30/18* | (2012.01) |
| *B60W 40/076* | (2012.01) |

(52) U.S. Cl.
CPC ............. *B60W 40/10* (2013.01); *B60L 3/102* (2013.01); *B60L 15/2009* (2013.01); *B60W 10/08* (2013.01); *B60W 10/18* (2013.01); *B60W 30/18172* (2013.01); *B60W 40/076* (2013.01); *B60L 2240/46* (2013.01); *B60L 2240/642* (2013.01); *B60W 2422/70* (2013.01); *B60W 2520/105* (2013.01); *B60W 2520/26* (2013.01)

(58) Field of Classification Search
None
See application file for complete search history.

(56) References Cited

U.S. PATENT DOCUMENTS

| | | | | |
|---|---|---|---|---|
| 5,265,946 | A * | 11/1993 | Bader | B60T 8/172 |
| | | | | 303/189 |
| 8,583,354 | B2 * | 11/2013 | Klier | B60W 40/13 |
| | | | | 180/282 |

(Continued)

FOREIGN PATENT DOCUMENTS

| | | | | |
|---|---|---|---|---|
| EP | 2910443 A1 * | 8/2015 | ............ | B60L 15/38 |
| JP | 6185921 B2 * | 8/2017 | ............ | B60L 15/38 |

(Continued)

*Primary Examiner* — Kevin R Steckbauer
(74) *Attorney, Agent, or Firm* — Oliff PLC

(57) ABSTRACT

An estimation device is provided with a braking-driving force acquiring unit that acquires, based on a signal from a sensor that detects a force, braking-driving force information as information indicating a braking force or a driving force applied to wheels of the vehicle; a wheel load acquiring unit that acquires, based on the braking-driving force information, a wheel load received by the wheels from a road surface; and an estimation unit that estimates, based on a value of the wheel load of each wheel included in the vehicle, a gravity center position of the vehicle.

10 Claims, 15 Drawing Sheets

(56) References Cited

U.S. PATENT DOCUMENTS

| | | | | |
|---|---|---|---|---|
| 8,751,141 | B2* | 6/2014 | Ranc | B60T 8/17551 |
| | | | | 701/124 |
| 10,752,224 | B2* | 8/2020 | Doray | B60W 40/13 |
| 10,768,070 | B2* | 9/2020 | Doray | G01M 17/007 |
| 11,541,894 | B2* | 1/2023 | Fukazawa | B62D 6/00 |
| 11,584,344 | B2* | 2/2023 | Kim | B60T 8/3215 |
| 11,807,249 | B2* | 11/2023 | Nasu | B60W 40/10 |
| 2002/0147532 | A1* | 10/2002 | Inagaki | B62D 7/159 |
| | | | | 701/91 |
| 2009/0099718 | A1* | 4/2009 | Kobetz | B60G 17/0164 |
| | | | | 701/31.4 |
| 2009/0171526 | A1* | 7/2009 | Takenaka | B60W 40/101 |
| | | | | 701/70 |
| 2012/0173133 | A1* | 7/2012 | Ranc | B60T 8/17551 |
| | | | | 701/124 |
| 2015/0266487 | A1* | 9/2015 | Kato | B60W 40/13 |
| | | | | 701/22 |
| 2018/0118220 | A1 | 5/2018 | Kimura | |
| 2018/0306665 | A1* | 10/2018 | Doray | G01M 1/122 |
| 2019/0054905 | A1* | 2/2019 | Doray | B60T 8/172 |
| 2021/0229646 | A1* | 7/2021 | Kim | B60T 8/17551 |
| 2022/0017105 | A1* | 1/2022 | Nasu | B60W 40/109 |
| 2022/0068047 | A1* | 3/2022 | Stenbratt | B60T 17/221 |
| 2022/0289208 | A1* | 9/2022 | Hattori | B60W 30/04 |
| 2023/0092314 | A1* | 3/2023 | Ueda | B60W 40/10 |
| | | | | 701/70 |

FOREIGN PATENT DOCUMENTS

| | | | | |
|---|---|---|---|---|
| WO | WO-2014061108 A1 * | 4/2014 | | B60L 15/38 |
| WO | WO-2021241018 A1 * | 12/2021 | | B60L 15/009 |

* cited by examiner

ESTIMATION DEVICE

CROSS-REFERENCE TO RELATED APPLICATIONS

This application is the U.S. bypass application of International Application No. PCT/JP2021/14703 filed on Apr. 7, 2021, which designated the U.S. and claims priority to Japanese Patent Application No. 2020-092373 filed on May 27, 2020, the contents of both of these are incorporated herein by reference.

BACKGROUND

Technical Field

The present disclosure relates to an estimation device that estimates a gravity center position of a vehicle.

Description of the Related Art

The gravity center position of a vehicle may preferably be detected in order to maintain the stability of the travelling posture of the vehicle during acceleration or deceleration. However, the gravity center position of the vehicle is not always constant and varies depending on positions of the passengers or luggage in the vehicle.

SUMMARY

An estimation device according to the present disclosure estimates a gravity center position of a vehicle. The estimation device includes a braking-driving force acquiring unit that acquires, based on a signal from a sensor that detects a force, braking-driving force information as information indicating a braking force or a driving force applied to wheels of the vehicle; a wheel load acquiring unit that acquires, based on the braking-driving force information, a wheel load received by the wheels from a road surface; and an estimation unit that estimates, based on a value of the wheel load of each wheel included in the vehicle, a gravity center position of the vehicle.

DETAILED DESCRIPTION OF THE DRAWINGS

The gravity center position of a vehicle may preferably be detected in order to maintain the stability of the travelling posture for the vehicle during acceleration or deceleration operation. However, the gravity center position of the vehicle is not always constant and varies depending on position of the passengers or luggage in the vehicle.

In this respect, patent literature WO2014061108 discloses a gravity center estimation device that estimates the gravity center position of a vehicle. The gravity center estimation device estimates a load value received by respective wheels from the road surface with a calculation in accordance with a torque control value applied to the respective wheels, whereby the gravity center position is estimated based on the estimated load value.

Since the above-mentioned control value is a command value of a torque applied to the wheels, the command value does not correspond to the actual torque, producing a difference between the command value and the actual torque. If such a difference is produced, the gravity center position of the vehicle cannot be accurately estimated.

Hereinafter, with reference to the accompanying drawings, the present embodiment will be described. In order to facilitate understanding of the explanation, the same reference symbols are applied to the same element in each drawing.

Figure 1:
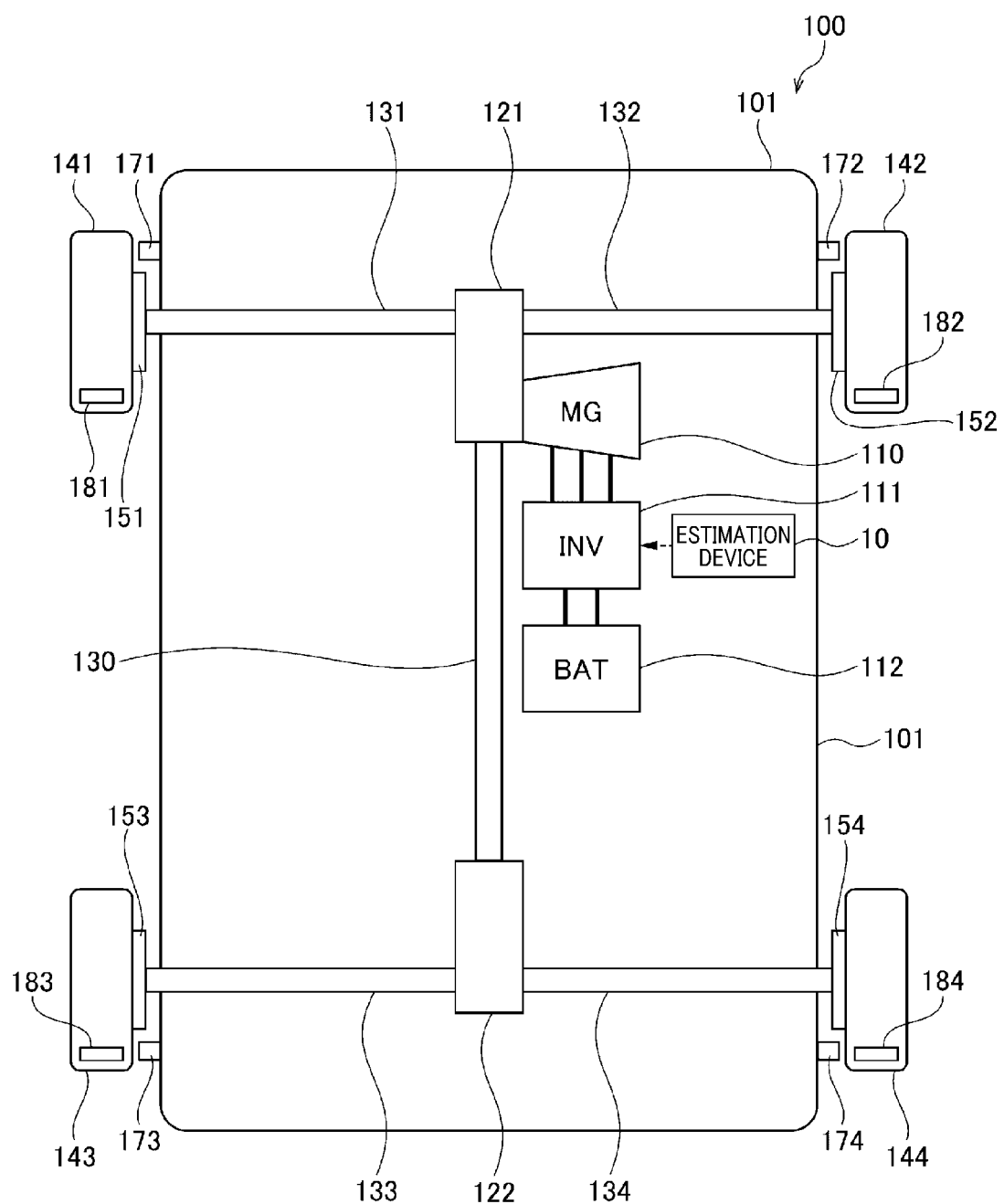
FIG. 1 is a diagram schematically showing a configuration of a vehicle on which an estimation device according to a first embodiment is mounted.

A first embodiment will be described. An estimation device 10 according to the present embodiment is mounted to a vehicle 100, and is configured as a device for estimating the gravity center position of the vehicle 100. Firstly, with reference to FIG. 1, a configuration of the vehicle 100 will be described before explaining an estimation device 10. FIG. 1 schematically illustrates a configuration of the vehicle 100 in a top view.

The vehicle 100 according to the present embodiment is configured as an automatic driving vehicle in which all of the necessary operations for driving are automatically performed. Thus, the vehicle 100 may be configured as a vehicle in which all of the necessary operations for driving are automatically performed, but may be configured as a vehicle in which a part of or all of the necessary operations for driving is performed by the driver.

As shown in FIG. 1, the vehicle 200 is provided with a vehicle body 101, wheels 141, 142, 143 and 144, a motor generator 110, an inverter 111 and a battery 112.

The vehicle body 101 is a body part of the vehicle 100 and generally referred to as body. The wheel 141 is provided at a front left part of the vehicle body 101. The wheel 142 is provided at a front right part of the vehicle body 101. The wheel 143 is provided at a rear left part of the vehicle body 101. The wheel 143 is provided at a rear right part of the vehicle body 101.

The motor generator 110 is a rotary electric machine for generating a driving force required for travelling of the vehicle 100. The power required for operating the motor generator 110 is supplied to the motor generator 110 from the battery 112 via the inverter 111. The driving force generated by the motor generator 110 is transmitted to the wheels 141 and the like via a differential gear 121 and 122 which will be described later.

The inverter 111 serves as a power converter that converts DC power supplied from the battery 112 to a three-phase AC power which to be supplied to the motor generator 110. The operation of the inverter 11 is controlled by the estimation device 10. Thus, the power supplied to the motor generator 110 is adjusted. As a result, an amount of the driving force generated by the motor generator 110 is adjusted. Note that an amount of the driving force may be performed by a higher-order ECU provided separately from the estimation device 10.

The battery 112 serves as a storage device for storing power required for driving the vehicle 100. The battery 112 is configured as a lithium-ion battery. As described, the power stored in the battery 112 is supplied to the inverter 111 via the motor generator 110.

A configuration in which the driving force generated by the motor generator 110 is transmitted to the wheel 141 and the like will be described. The vehicle 100 is provided with the differential gear 121 and 122. Further, a drive shaft 131 connects the wheel 141 and the differential gear 121, and a drive shaft 132 connects the wheel 142 and the differential gear 121. Similarly, a drive shaft 133 connects the wheel 143 and the differential gear 122, and a drive shaft 134 connects the wheel 144 and the differential gear 122.

The driving force generated in the motor generator 110 is transmitted to the drive shaft 131 via the differential gear 121 and causes to rotate the wheel 141 together with the drive shaft 131. Further, the above-described driving force is also transmitted to the drive shaft 132 via the differential gear 121 and causes to rotate the wheel 142 together with the drive shaft 132.

The driving force generated by the motor generator 110 is transmitted to a propeller shaft 130 via the differential gear 121 and causes to rotate the propeller shaft 130. The driving force is transmitted to the drive shaft 133 via the differential gear 122 and causes to rotate the wheel 143 together with the drive shaft 133. Further, the above-described driving force is also transmitted to the drive shaft 134 via the differential gear 122 and causes to rotate the wheel 144 together with the drive shaft 134.

As described, the driving force generated by the motor generator 110 is transmitted to all of four wheels 141 and the like included in the vehicle 100. The drive shafts 131, 132, 133 and 134 are members each transmits the driving force to corresponding wheels 141, 142, 143 and 144.

For the wheel 141, a braking apparatus 151 is provided. The braking apparatus 151 applies a braking force to the wheel 141. The operation of the braking apparatus 151 is controlled by the estimation device 10.

Similar to the above-described configuration, the wheel 142 is provided with a braking apparatus 152, the wheel 143 is provided with a braking apparatus 153, and the wheel 144 is provided with a braking apparatus 154. Each operation of the braking apparatuses 152, 153 and 154 is controlled by the estimation device 10. The respective operations of the braking apparatuses 151, 152, 153 and 154 are individually adjusted, whereby each rotational speed of the wheels 141, 142, 143 and 144 can be individually adjusted.

The wheel speed sensors 171, 172, 173 and 174 are provided in the vehicle 100. The wheel speed sensor 171 measures a rotational speed per unit time of the wheel 141. Hereinafter, the rotational speed per unit time of the wheel 141 is also referred to as simply rotational speed of the wheel 141. The same applied to the wheels 142, 143 and 144. A signal indicating the rotational speed of the wheel 141 measured by the wheel speed sensor 171 is transmitted to the estimation device 10.

The wheel speed sensor 172 measures a rotational speed per unit time of the wheel 142. A signal indicating the rotational speed of the wheel 142 measured by the wheel speed sensor 172 is transmitted to the estimation device 10.

The wheel speed sensor 173 measures a rotational speed per unit time of the wheel 143. A signal indicating the rotational speed of the wheel 143 measured by the wheel speed sensor 173 is transmitted to the estimation device 10.

The wheel speed sensor 174 measures a rotational speed per unit time of the wheel 144. A signal indicating the rotational speed of the wheel 144 measured by the wheel speed sensor 174 is transmitted to the estimation device 10.

An in-wheel sensor 181 is embedded in the wheel 141 at a portion in the vicinity of an outer peripheral portion that contacts the road surface. The in-wheel sensor 181 measures an amount of force acting between the wheel 141 and the road surface along the circumferential direction of the wheel 141. The force measured by the in-wheel sensor 181 equals to the braking force or the driving force applied to the wheel 141. As the in-wheel sensor 181, for example, piezoelectric element can be utilized.

Similarly, an in-wheel sensor 182 is embedded to the wheel 142, an in-wheel sensor 183 is embedded to the wheel 143, and an in-wheel sensor 184 is embedded to the wheel 144. The signals indicating force measured by respective in-wheel sensors 182, 183, 184 are transmitted to the estimation device 10. The information indicated by the signals transmitted to the estimation device 10 from the in-wheel sensors 181, that is, the information indicating the braking force or the driving force applied to respective wheels 141 and the like are also referred to as braking-driving force information.

The in-wheel sensors 182, 183 and 184 serve as sensors that detect forces and are provided on the vehicle 100 as the sensors acquiring the above-mentioned braking-driving force information. According to the present embodiment, the in-wheel sensors 182, 183 and 184 having such a purpose are directly attached to the respective wheels 141 and the like included in the vehicle 100.

Figure 2:
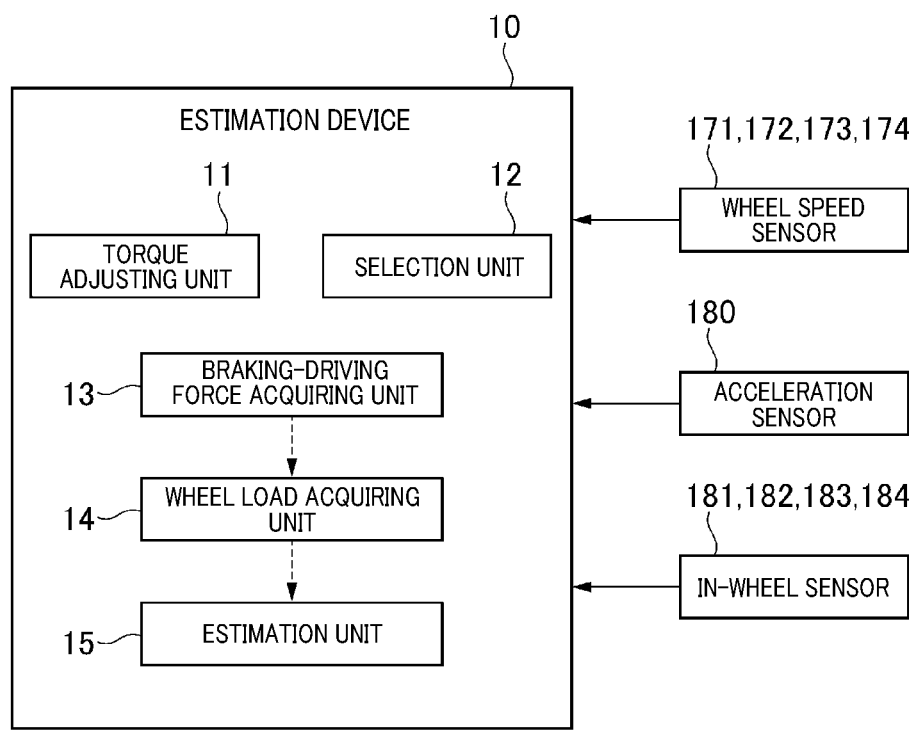
FIG. 2 is a diagram schematically showing a configuration of the estimation device according to the first embodiment.

Other configurations of the vehicle 100 will be described. As shown in FIG. 2, the vehicle 100 is provided with an acceleration sensor 180. The acceleration sensor 180 detects an acceleration of the vehicle 100. The acceleration sensor 180 is attached to the vehicle body 101. The acceleration sensor 180 is capable of detecting acceleration factors in the longitudinal direction, the lateral direction and the vertical direction of the vehicle body 101. The signals indicating respective acceleration factors detected by the acceleration sensor 180 are transmitted to the estimation device 10. In addition to the acceleration sensor 180, a yaw rate sensor for measuring the yaw rate of the vehicle 100 may be provided.

Subsequently, with reference to FIG. 2, configuration of the estimation device 10 will be described. The estimation device 10 is configured as a computer system provided with CPU, ROM, RAM and the like. Note that the estimation device 10 according to the present embodiment is configured to perform a process for controlling a travelling of the vehicle 100 in addition to a process for estimating the gravity center position of the vehicle 100. Alternatively, instead of this configuration, the estimation device may only perform the estimation of the gravity center position of the vehicle 100, while an additionally provided higher-order ECU may perform the process for controlling the travelling of the vehicle 100. Further, the process for controlling the travelling of the vehicle 100 and the process for estimating the gravity center position of the vehicle 100 may be performed by a plurality of control units provided in the vehicle. The specific configuration of the device is not limited in order to achieve the function of the estimation device 10 which will be described later.

The estimation device 10 is provided with, as block elements representing the functions, a torque adjusting unit 11, a selection unit 12, a braking-driving force acquiring unit 13, a wheel load acquiring unit 14 and an estimation unit 15.

The torque adjusting unit 11 adjusts the braking force or the driving force of respective wheels 141 and the like individually. The torque adjusting unit 11 of the present embodiment individually controls the braking apparatus 151, 152, 153 and 154, thereby performing the above adjustment. In the following explanation, the braking force or the driving force for respective wheels 141 and the like are also referred to as braking-driving force.

The selection unit 12 performs a selection process to select two wheels in the plurality of wheels of the vehicle 100 (four wheels according to the present embodiment). Hereinafter, one wheel in the two wheels selected by the selection unit 12 is referred to as first wheel and the other wheel is referred to as second wheel. The reason why such a selection is required will be described later.

The braking-driving force acquiring unit 13 performs a process for acquiring the braking-driving force information which was described in the above. The braking-driving force acquiring unit 13 acquires the braking-driving force information based on the signals transmitted from respective in-wheel sensors 181, 182, 183 and 184 which are sensors to detect force.

The wheel load acquiring unit 14 performs a process for acquiring, based on the braking-driving force information acquired by the braking-driving force acquiring unit 13, the wheel loads received by the wheels 141, 142, 143 and 144 from the road surface. The wheel load refers to a force received from the road surface along a direction perpendicular to the road surface. An amount of wheel load received by each of the wheels 141 and the like varies depending on the gravity center position of the vehicle 100. The amount of wheel loads are normally different values between wheels. The specific contents of processes performed by the wheel load acquiring unit 14 for acquiring the wheel loads of respective wheels 414 and the like will be described later.

The estimation unit 15 estimates the gravity center position of the vehicle 100 based on the above-described wheel load values corresponding to the wheels 141, 142, 143 and 144 included in the vehicle 100. The specific contents of processes performed by the estimation unit 15 for estimating the gravity center position will be described later.

Figure 3:
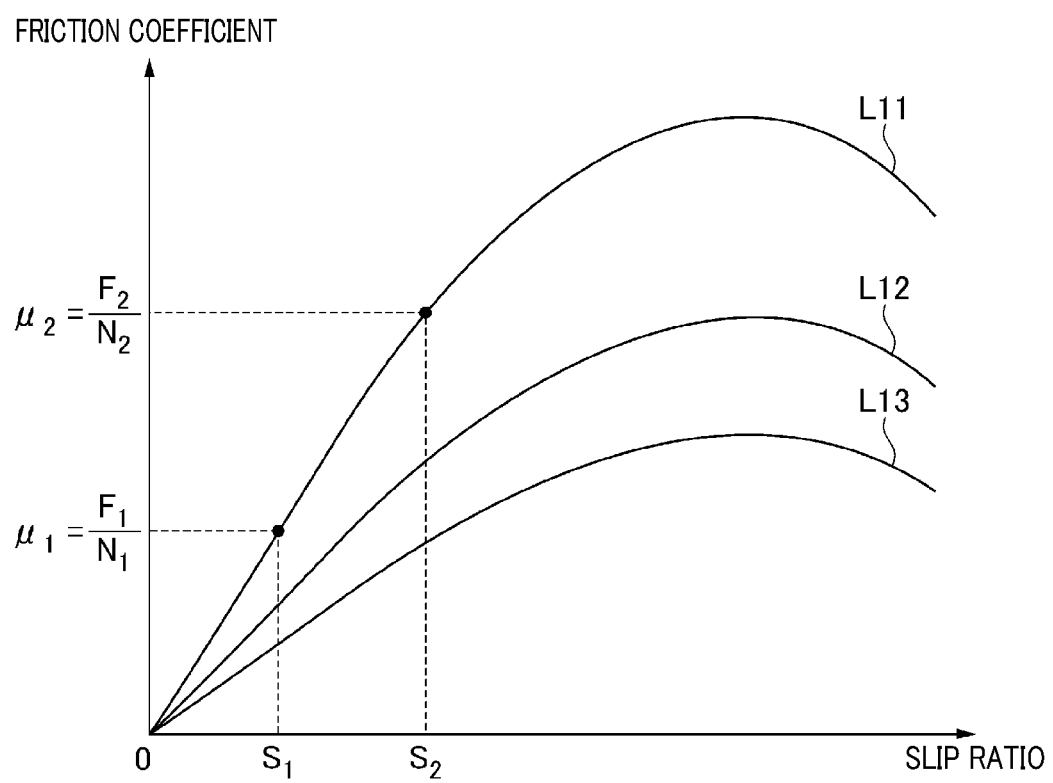
FIG. 3 is a graph showing a relationship between a slip ratio and a frictional coefficient.

Here, with reference to FIG. 3, a relationship between the slip ratio and the frictional coefficient will be described. The slip ratio indicated by the vertical axis in FIG. 3 is an index showing a slip state between the wheel 141 and the like and the road surface. For example, the slip ratio $S_{LF}$ of the wheel 141 is expressed by the following equation (1).

[Math 1]
$$S_{LF} = \frac{V - V_{LF}}{V} \quad (1)$$

V in the equation (1) refers to a travelling speed of the vehicle 100. $V_{LF}$ in the equation (1) refers to a relative speed of a portion of the wheel 141 contacting with the road surface relative to the vehicle body 101

As indicated by the line L11 in FIG. 3, a correlation is present between the slip ratio of the wheel (horizontal axis) and the friction coefficient (vertical axis). The line L11 expresses a relationship between the slip ratio and the friction coefficient in a state of the road surface where the slip is unlikely to occur such as a case where the road surface is dry. The line L12 expresses a relationship between the slip ratio and the friction coefficient in a state of the road surface where the slip is likely to occur such as a case where the road surface is wet. The line L13 expresses a relationship between the slip ratio and the friction coefficient in a state of the road surface where the slip is more likely to occur such as a case where the road surface is covered with snow. Hereinafter, the inclinations in the respective graphs indicated by the line L11 and the like are referred to as μ slope.

As shown in FIG. 3, the relationship between the slip ratio and the friction coefficient varies depending on the state of the road surface. In other words, when the state of the road surface is the same, the relationship between the slip ratio and the friction coefficient is substantially uniquely determined.

Further, as shown in FIG. 3, in any respective examples of the lines L11, L12 and L13, the relationship between the slip ratio and the friction coefficient has a proportional relationship in a range having relatively small slip ratio. Specifically, in the range having relatively small slip ratio, respective graphs each showing a relationship between the slip ratio and the friction coefficient are linear lines in a range having relatively small slip ratio, and the μ slopes of respective graphs are constant value.

In an example indicated by the line L11 in FIG. 3, when the slip ratio of the wheel is $S_1$, the wheel load received by the wheel is $N_1$ and the force received by the wheel from the road surface is $F_1$. Further, the when the slip ratio of the wheel is $S_2$, the wheel load received by the wheel is $N_2$ and the force received by the wheel from the road surface is $F_2$.

In either case where the slip ratio of the wheel is $S_1$ or $S_2$, as described above, the μ slope is constant value. Hence, the point $(S_1, \mu_1)$ and the point $(S_2, \mu_2)$, when expressing $\mu_1 = F_1/N_1$ and $\mu_2 = F_2/N_2$, are on the same linear line in FIG. 3.

As described above, in the estimation device 10, the wheel load acquiring unit 14 acquires the wheel load for each wheel 141 and the like, and the estimation unit 15 estimates the gravity center position of the vehicle 100 based on the acquired respective wheel load values.

The content of processes performed by the wheel load acquiring unit 14 in order to acquire the wheel loads for respective wheels 141 and the like will be described. As described with reference to FIG. 3, assuming that the state of the road surface on which the vehicle 100 travels is constant, the μ slope of respective wheels 141 and the like are all the same value. Hence, the following equation (2) is satisfied.

[Math 2]

$$\frac{\mu_{LF}}{S_{LF}} = \frac{\mu_{LR}}{S_{LR}} = \frac{\mu_{RF}}{S_{RF}} = \frac{\mu_{RR}}{S_{RR}} \qquad (2)$$

A term $\mu_{LF}$ in the equation (2) refers to a friction coefficient between the front left side wheel 141 and the road surface. A term $S_{LF}$ in the equation (2) is a slip ratio of the wheel 141. Similarly, a term $\mu_{LR}$ refers to a friction coefficient between the rear left side wheel 143 and the road surface. $S_{LR}$ is a slip ratio of the wheel 143. $\mu_{RF}$ is a friction coefficient between the front right wheel 142 and the road surface. $\mu_{RR}$ is a friction coefficient between the rear right wheel 144 and the road surface. $S_{RR}$ is a slip ratio of the wheel 144.

Here, when controlling the rotational speed of the wheel 141 and the rotational speed of the wheel 143 to be mutually the same, since the slip ratios are $S_{LF}=S_{LR}$ under this control, the following equation (3) is derived from the equation (2).

[Math 3]

$$\mu_{LF}=\mu_{LR} \qquad (3)$$

Hereinafter, the wheel load received by the wheel 141 from the road surface is referred to as $N_{LF}$. Also, the force received by the wheel 141 from the road surface is referred to as $F_{LF}$. Similarly, the wheel load received by the wheel 143 from the road surface is referred to as $N_{LR}$. The force received by the wheel 143 from the road surface is referred to as $F_{LR}$. The wheel load received by the wheel 142 from the road surface is referred to as $N_{RF}$. The force received by the wheel 142 from the road surface is referred to as $F_{RF}$. The wheel load received by the wheel 144 from the road surface is referred to as $N_{RR}$. The force received by the wheel 144 from the road surface is referred to as $F_{RR}$.

The equation (3) can be modified to be the following equation (4) by using $N_{LF}$ and $F_{LF}$.

[Math 4]

$$\frac{F_{LF}}{N_{LF}} = \frac{F_{LR}}{N_{LR}} \qquad (4)$$

With further modification of the equation (4), the relationship between $N_{LF}$ and $N_{LR}$ can be expressed by the following equation (5).

[Math 5]

$$N_{LR} = \frac{F_{LR}}{F_{LF}} N_{LF} \qquad (5)$$

In the right side of the equation (5), a coefficient of $N_{LF}$, that is, $F_{LR}/F_{LF}$ refers to a ratio of the wheel load $N_{LF}$ received by the wheel 141 to wheel load $N_{LR}$ received by the wheel 143. The ratio of the wheel loads received by respective pair of wheels is referred to as wheel load ratio hereinafter.

The values $F_{LR}$ and $F_{LF}$ can be acquired based on the signals of the in-wheel sensors 181 and 183. Hence, the wheel load ratio in this example, that is, the value of $F_{LR}/F_{LF}$ is a known value which can be acquired in accordance with the braking-driving force information.

As described in the above example, in the case where the rotational speed of the pair of wheels in a plurality of wheels included in the vehicle 100 are controlled to be the same, the wheel load ratio of the pair of wheels is calculated and an equation expressing the relationship between respective wheel load like the equation (5) can be acquired.

In the estimation device 10, the braking-driving force acquiring unit 13 performs a process for setting the rotational speed of the pair of wheels selected by the selection unit 12, that is, the first wheel and the second wheel, to be temporarily the same. In this state, the braking-driving force acquiring unit 13 acquires the first information ($F_{LF}$ in the above example) as braking-driving information of the first wheel, and the second information ($F_{LR}$ in the above example) as braking-driving information of the second wheel. Further, the wheel load acquiring unit 14 performs a process for calculating the above-described wheel load ratio between the first wheel and the second wheel.

According to the above-described example, the wheel 141 is selected as the first wheel and the wheel 143 is selected as the second wheel. As a result, the above equation (5) is acquired. The following equation (6) can be acquired as a result of selecting the wheel 141 as the first wheel and the wheel 142 as the second wheel and performing similar process as described above.

[Math 6]

$$N_{RF} = \frac{F_{RF}}{F_{LF}} N_{LF} \qquad (6)$$

Similarly, when selecting the wheel 141 as the first wheel and the wheel 144 as the second wheel and performing the similar process as described above, the following equation (7) can be acquired.

[Math 7]

$$N_{RR} = \frac{F_{RR}}{F_{LF}} N_{LF} \qquad (7)$$

In the right side of the equation (6), a coefficient of $N_{LF}$, that is, $F_{RF}/F_{LF}$ refers to a wheel load ratio which is a ratio of the wheel load $N_{LF}$ received by the wheel 141 to the wheel load $N_{RF}$ received by the wheel 142. In the right side of the equation (7), a coefficient of $N_{LF}$, that is, $F_{RR}/F_{LF}$ refers to a wheel load ratio which is a ratio of the wheel load $N_{LF}$ received by the wheel 141 to the wheel load $N_{RR}$ received by the wheel 144. Similar to the wheel load ratio expressed by the above equation (5), the wheel load ratio expressed by each of the equations (5) and (7) is known value which can be acquired based on the braking-driving force information from the in-wheel sensor 181 or the like.

The equations (5), (6), (7) each expresses a wheel load corresponding wheel, that is, wheel 143, the wheel 142 and the wheel 144, using a relationship with the wheel load of the wheel 141. In order to acquire respective equations, the selection unit 12 always selects specific wheel 141 as a first wheel, and subsequently selects other wheels 143, 142 and 144 as the second wheel. For the first wheel, a wheel other than the wheel 141 may be used.

When calculating a sum of wheel loads for the wheels 141 and the like included in the vehicle 100, the calculated sum value should equal to the total weight of the vehicle 100. Hence, the following equation (8) is satisfied.

[Math 8]

$$N_{LF}+N_{LR}+N_{RF}+N_{RR}=W \tag{8}$$

W in the right side of the equation (8) is a total weight of the vehicle 100. Note that the unit of W equals to a unit of $N_{LF}$ or the like (e.g. newton). The total weight is a known value as one of specifications of the vehicle 100. The total weight may be used including a weight of passengers which is measured by a weight sensor provided at each seat.

The equation (8) can be modified to be the following equation (9) using the equations (5), (6) and (7).

[Math 9]

$$\left(1+\frac{F_{LR}}{F_{LF}}+\frac{F_{RF}}{F_{LF}}+\frac{F_{RR}}{F_{LF}}\right)N_{LF}=W \tag{9}$$

In the equation (9), values other than $N_{LF}$ are all known values. Hence, with the equation (9), $N_{LF}$ value can be calculated. Further, when using the calculated $N_{LF}$ value, respective value of $N_{LR}$, $N_{RF}$ and $N_{RR}$ can be calculated with the equations (5), (6) and (7). The wheel load acquiring unit 14 performs the above-described processes, whereby the respective values of $N_{LF}$, $N_{LR}$, $N_{RF}$ and $N_{RR}$ as the wheel loads of respective wheels are calculated and acquired.

Figure 4:
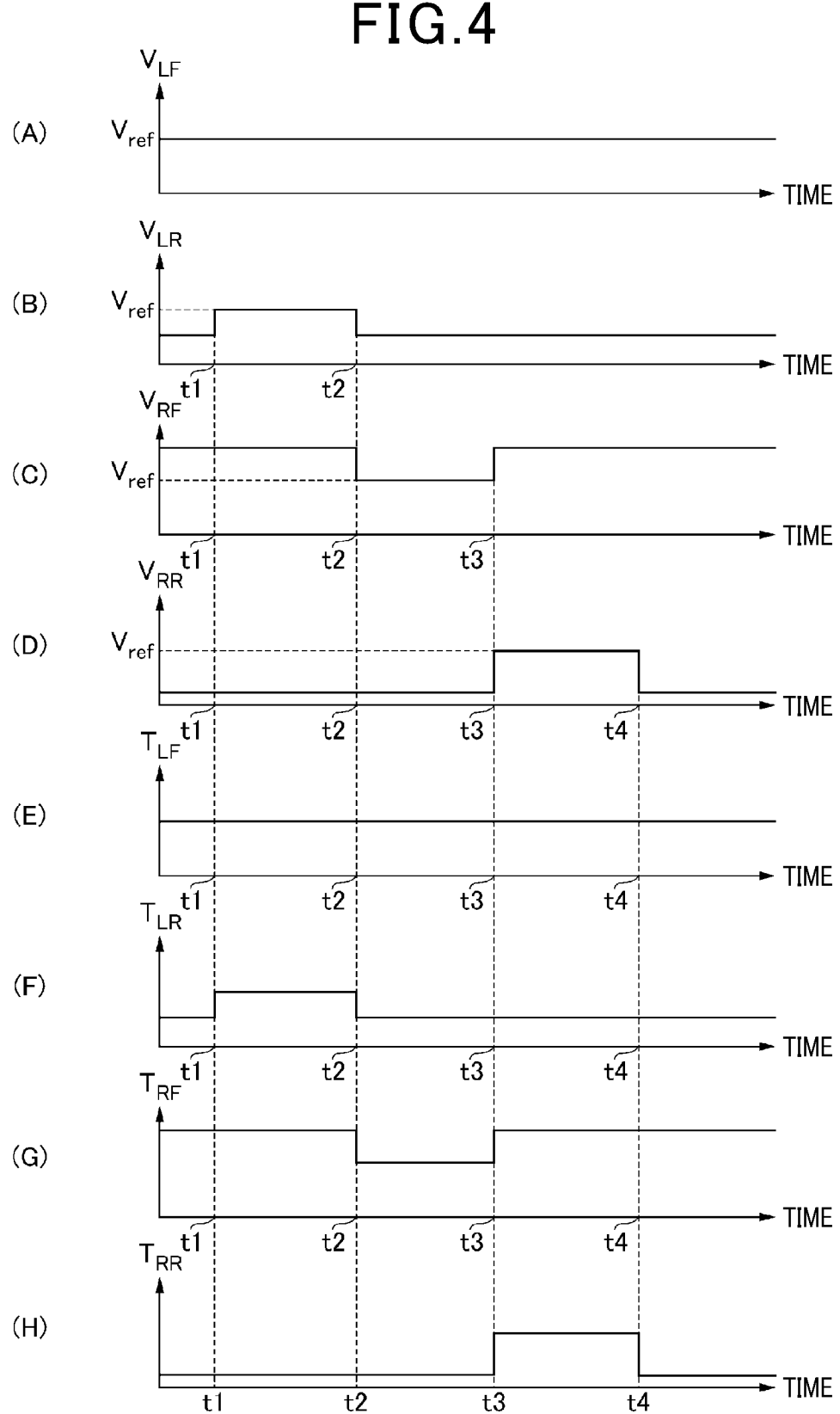
FIG. 4 is a diagram showing a method for learning a wheel load of each wheel according to the first embodiment.

FIG. 4 is a timing diagram showing a change in the rotational speed and the like of respective wheels when respective wheel load values are acquired. In FIG. 4, (A) indicates a change in the rotational speed of the wheel 141 with respect to time. The timing chart (B) in FIG. 4 indicates a change in the rotational speed of the wheel 143 with respect to time. The timing chart (C) in FIG. 4 indicates a change in the rotational speed of the wheel 142 with respect to time. The timing chart (D) in FIG. 4 indicates a change in the rotational speed of the wheel 144 with respect to time. As shown in FIG. 4, hereinafter, the respective rotational speed of wheels 141, 142, 143 and 144 are also expressed $V_{LF}$, $V_{RF}$, $V_{LR}$ and $V_{RR}$ respectively.

The timing chart (E) in FIG. 4 is a change in torque of the wheel 141 with respect to time. The time chart (F) in FIG. 4 is a change in torque of the wheel 143 with respect to time. The timing chart (G) in FIG. 4 is a change in torque of the wheel 143 with respect to time. The timing chart (H) in FIG. 4 is a change in torque of the wheel 144 with respect to time. As shown in FIG. 4, the respective torque of the wheels 141, 142, 143 and 144 are also referred to as $T_{LF}$, $T_{RF}$, $T_{LR}$ and $T_{RR}$ respectively.

As shown in the timing chart (A) in FIG. 4, the rotational speed of the wheel 141 is $V_{ref}$. In the timing chart (A) in FIG. 4, the $V_{ref}$ value is always constant, but the $V_{ref}$ value may change with respect time. Thus, hereinafter, the rotational speed of the wheel 141 is referred to as $V_{ref}$ including a case where the rotational speed of the wheel 141 changes at some points.

In the example shown in FIG. 4, a process for acquiring the wheel load starts at time t1. At time t1, the selection unit 12 selects the wheel 141 as the first wheel and the wheel 143 as the second wheel. As shown in FIG. 4B, after the time t1, the process controls the rotational speed of the wheel 143 as the second wheel to match the rotational speed of the wheel 141 as the first wheel, that is, $V_{ref}$. Such an adjustment of the rotational speed of the wheel 143 is accomplished such that the torque adjusting unit 11 causes, based on a command from the braking-driving force acquiring unit 13, the braking apparatus 153 to operate, thereby controlling the torque of the wheel 143 as shown in the timing chart (F) in FIG. 4.

The process for controlling the rotational speed of the wheel 141 to match the rotational speed of the wheel 143 may be accomplished by adjusting the rotational speed of the wheel 143 as described above, but may be performed by adjusting the rotational speed of the wheel 141. Also, this process may be accomplished by adjusting both the rotational speed of the wheel 141 and the rotational speed of the wheel 143. Furthermore, when adjusting the rotational speed of the wheels, the driving force of the motor generator 110 may be adjusted in addition to adjustments of operations for the braking apparatus 151 and the braking apparatus 153.

In a period from time t1 to time t2, the rotational speed of the wheel 141 matches the rotational speed of the wheel 143. In this period, $F_{LF}$ as the braking-driving force information (i.e. first information) of the wheel 141 is acquired and $F_{LR}$ as the braking-driving force information (i.e. second information) of the wheel 143 is acquired. Thereafter, the wheel load ratio ($F_{LR}/F_{LF}$) is calculated based on this first information and second information to acquire the equation (5). At time t2, process for adjusting the rotational speed of the wheel 143 is terminated. Thereafter, the rotational speed of the wheel 143 changes in the course of nature.

At time t2, the selection unit 12 selects the wheel 141 as the first wheel and selects the wheel 142 as the second wheel. As shown in the timing chart (C) in FIG. 4, after time t2, the process controls the rotational speed of the wheel 142 as the second wheel to match the rotational speed of the wheel 141 as the first wheel, that is, $V_{ref}$. Such an adjustment of the rotational speed of the wheel 142 is accomplished such that the torque adjusting unit 11 causes, based on a command of the braking-driving force acquiring unit 13, the braking apparatus 152 to operate, thereby controlling the torque of the wheel 142 as shown in the timing chart (G) in FIG. 4.

The process for controlling the rotational speed of the wheel 141 to match the rotational speed of the wheel 142 may be accomplished by adjusting the rotational speed of the wheel 142 as described above, but may be performed by adjusting the rotational speed of the wheel 141. Also, this process may be accomplished by adjusting both the rotational speed of the wheel 141 and the rotational speed of the wheel 142. Furthermore, when adjusting the rotational speed of the wheels, the driving force of the motor generator 110 may be adjusted in addition to adjustments of operations for the braking apparatus 151 and the braking apparatus 152.

In a period from time t2 to time t3, the rotational speed of the wheel 141 matches the rotational speed of the wheel 142. In this period, $F_{LF}$ as the braking-driving force information (i.e. first information) of the wheel 141 is acquired and $F_{LR}$ as the braking-driving force information (i.e. second information) of the wheel 142 is acquired. Thereafter, the wheel load ratio ($F_{RF}/F_{LF}$) is calculated based on this first information and second information to acquire the equation (6). At time t3, process for adjusting the rotational speed of the wheel 142 is terminated. Thereafter, the rotational speed of the wheel 142 changes in the course of nature.

At time t3, the selection unit 12 selects the wheel 141 as the first wheel and selects the wheel 144 as the second wheel. As shown in the timing chart (D) in FIG. 4, after time t3, the process controls the rotational speed of the wheel 144 as the second wheel to match the rotational speed of the wheel 141 as the first wheel, that is, $V_{ref}$. Such an adjustment of the rotational speed of the wheel 144 is accomplished such that the torque adjusting unit 11 causes, based on a command of the braking-driving force acquiring unit 13, the braking apparatus 154 to operate, thereby controlling the torque of the wheel 144 as shown in the timing chart (H) in FIG. 4.

The process for controlling the rotational speed of the wheel 141 to match the rotational speed of the wheel 144 may be accomplished by adjusting the rotational speed of the wheel 144 as described above, but may be performed by adjusting the rotational speed of the wheel 141. Also, this process may be accomplished by adjusting both the rotational speed of the wheel 141 and the rotational speed of the wheel 144. Furthermore, when adjusting the rotational speed of the wheels, the driving force of the motor generator 110 may be adjusted in addition to adjustments of operations for the braking apparatus 151 and the braking apparatus 154.

In a period from time t3 to time t4, the rotational speed of the wheel 141 matches the rotational speed of the wheel 144. In this period, $F_{LF}$ as the braking-driving force information (i.e. first information) of the wheel 141 is acquired and $F_{LR}$ as the braking-driving force information (i.e. second information) of the wheel 144 is acquired. Thereafter, the wheel load ratio ($F_{RR}/F_{LF}$) is calculated based on the first information and the second information to acquire the equation (7). At time t4, process for adjusting the rotational speed of the wheel 144 is terminated. Thereafter, the rotational speed of the wheel 144 changes in the course of nature.

As described, in the case where the wheel load acquiring unit acquires the wheel loads, the process for controlling the rotational speed of the first wheel to match the rotational speed of the second wheel is subsequently executed for combinations of the first wheel and the second wheel. Since the period from a time t1 to a time t4 is relatively short, the road surface state in the period can be regarded as constant, that is, the μ slope can be regarded as constant.

Figure 5:
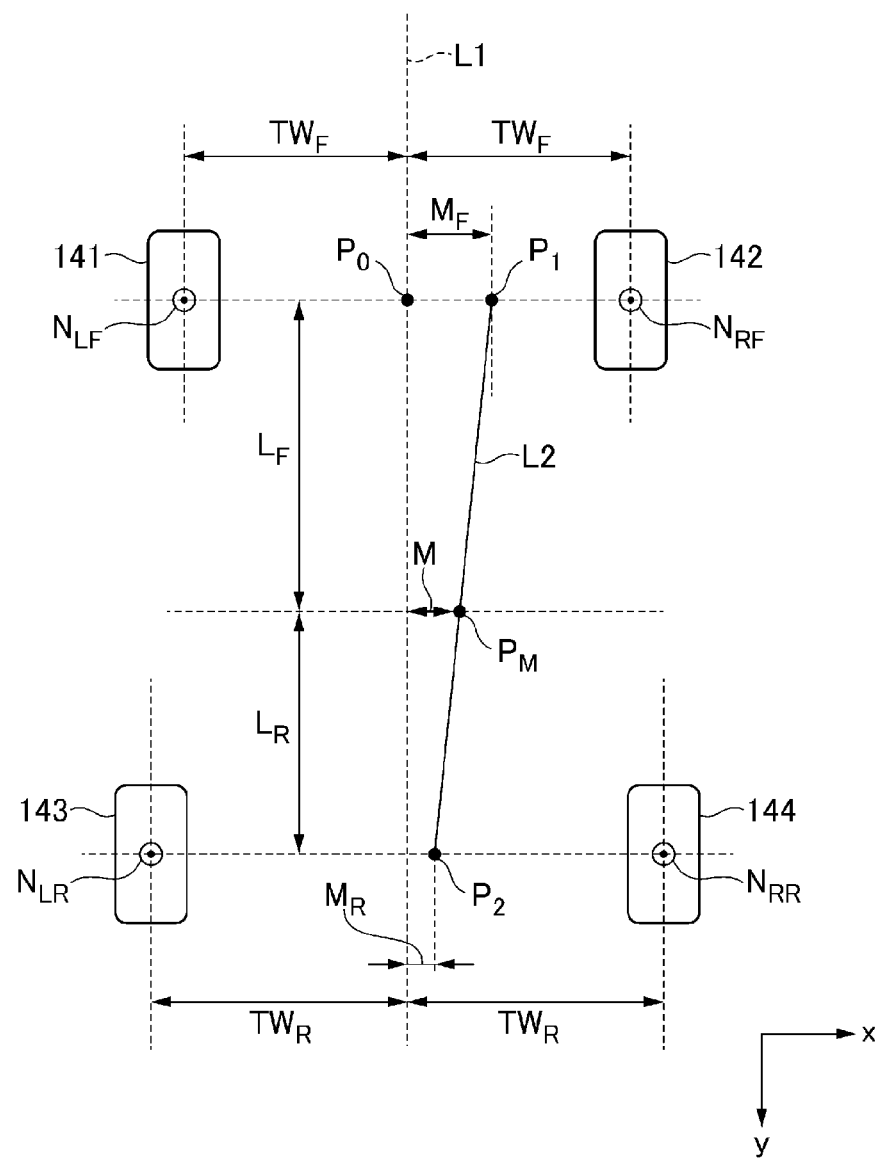
FIG. 5 is a diagram explaining an estimation method for a gravity center position based on the wheel load according to the first embodiment.

After respective values of the wheel loads $N_{LF}$, $N_{LR}$, $N_{RF}$ and $N_{RR}$ are acquired by the wheel load acquiring unit 14, the estimation device 15 estimates the gravity center position of the vehicle 100. With reference to FIG. 5, content of processes executed by the estimation device 15 will be described.

In FIG. 5, four wheels 141 and the like included in the vehicle 100 are schematically illustrated in top view. L1 shown in FIG. 5 is a linear line extending in the longitudinal direction through a center position in the lateral direction (left-right direction) of the vehicle 100. $TW_F$ shown in FIG. 5 is a half of the tread width between the wheel 141 and the wheel 142 as the front wheels. $TW_R$ shown in FIG. 5 is a half of the tread width between the wheel 143 and the wheel 144 as the rear wheels. Both $TW_F$ and $TW_R$ are known values as specifications of the vehicle 100.

$P_1$ shown in FIG. 5 is a point between the wheel 141 and the wheel 142, indicating a point balanced between $N_{LF}$ and $N_{RF}$. When expressing the distance between $P_1$ and linear line L1 to be $M_F$, the following equation (10) can be derived with a moment balance around the $P_1$.

[Math 10]

$$N_{LF}(TW_F + M_F) = N_{RF}(TW_F - M_F) \tag{10}$$

The equation (10) is modified, whereby $M_F$ can be expressed by the following equation (11).

[Math 11]

$$M_F = TW_F \frac{N_{RF} - N_{LF}}{N_{RF} + N_{LF}} \tag{11}$$

$P_2$ shown in FIG. 5 is a point between the wheel 143 and the wheel 144, indicating a point balanced between $N_{LR}$ and $N_{RR}$. When expressing the distance between $P_2$ and linear line L1 to be $M_R$, the following equation (12) can be derived with a moment balance around the $P_2$.

[Math 12]

$$N_{LR}(TW_R + M_R) = N_{RR}(TW_R - M_R) \tag{12}$$

The equation (12) is modified, whereby $M_R$ can be expressed by the following equation (13).

[Math 13]

$$M_R = TW_R \frac{N_{RR} - N_{LR}}{N_{RR} + N_{LR}} \tag{13}$$

$P_M$ shown in FIG. 5 is a point indicating the gravity center position to be acquired. As shown in FIG. 5, a linear line passing both $P_1$ and $P_2$ is defined as L2, the gravity center position $P_M$ is present on the linear line L2.

Hereinafter, a distance from the front wheel (wheel 141, 142) to $P_M$ along the longitudinal direction of the vehicle 100 is referred to as $L_F$. Also, a distance from the rear wheel (wheel 143, 142) to $P_M$ along the longitudinal direction of the vehicle 100 is referred to as $L_R$. The following equation (14) can be derived with a moment balance around the point $P_M$. The term L in the equation (14) refer to ($L_F + L_R$), that is, a distance between the front wheel and the rear wheel of the vehicle 100 along the longitudinal direction of the vehicle 100. This term L is a known value as one of specifications of the vehicle 100.

[Math 14]

$$\begin{aligned}L_F(N_{LF} + N_{RF}) &= L_R(N_{LR} + N_{RR})\\ &= (L - L_F)(N_{LR} + N_{RR})\end{aligned} \tag{14}$$

The equation (14) is modified, whereby $L_F$ can be expressed by the following equation (15).

[Math 15]

$$L_F = L \frac{N_{LR} + N_{RR}}{N_{LF} + N_{RF} + N_{LR} + N_{RR}} \tag{15}$$

Here, a cross point between a linear line connecting the wheel 141 and the wheel 142 and the linear line L1 is labeled as $P_0$. With $P_0$ as an origin, when y axis is set along a direction towards rear side of the vehicle 100 and x axis is set along a direction towards right side, the linear line L2 is expressed by the following equation (16).

[Math 16]

$$y = \frac{M_R - M_F}{L}x + M_F \quad (16)$$

When expressing a distance from the linear line L1 to the gravity center position $P_M$ along the lateral direction of the vehicle 100 to be M, M can be expressed by the following equation (17) when substituting $L_F$ for x in the above-described equation (16).

[Math 17]

$$M = \frac{M_R - M_F}{L}L_F + M_F \quad (17)$$

With the above-described xy coordinate, the gravity center position $P_M$ can be calculated as $(L_F, M)$.

With the above-described method, the estimation device 15 is able to estimate the coordinate of the gravity center position on a plane parallel to the road surface in accordance with $N_{LF}$, $N_{RF}$, $N_{RR}$ and the specification of the vehicle 100.

Figure 6:
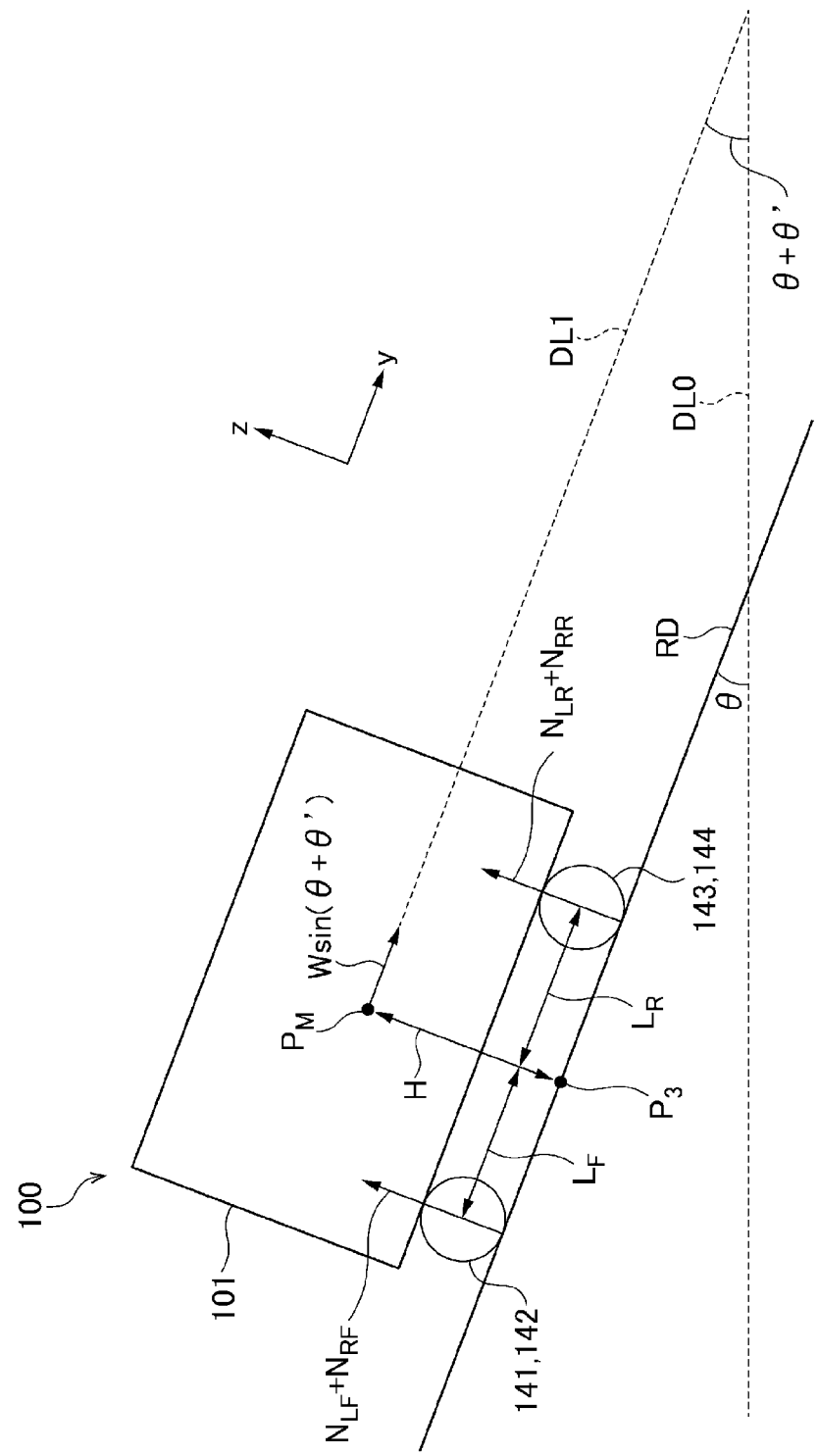
FIG. 6 is a diagram explaining an estimation method of the gravity center position based on the wheel load according to the present embodiment.

With reference to FIG. 6, an estimation method of the gravity center position along a direction orthogonal to the road surface, that is, the height of the gravity center position $P_M$ will be described. In FIG. 6, a portion labeled as RD is a road surface on which the vehicle 100 travels. Hereinafter, the road surface is also referred to as road surface RD. In FIG. 6, z axis is set along a direction orthogonal to the road surface RD and extending vertically. According to the present embodiment, the estimation device 15 estimates, when the vehicle 100 is travelling on the road surface RD inclined with respect to the horizontal surface, that is, the vehicle 100 is travelling on a gradient road, the height of the gravity center position $P_M$. Also, the estimation of the gravity center position $P_M$ which will be described in the following is performed after calculating respective value of $L_F$, $L_R$ with the above-described method.

The dotted line DL0 shown in FIG. 6 indicates a horizontal plane. θ shown in FIG. 6 is an angle formed between the horizontal plane and the road surface RD. θ' shown in FIG. 6 is an angle formed between the road surface RD and the linear line along the longitudinal direction of the vehicle 100 (dotted line DL1 in FIG. 6). θ' also refers to an inclined angle between the vehicle body 101 and the road surface RD.

$P_3$ indicated in FIG. 6 is a cross point between the linear line passing through the gravity center position $P_M$ and extending in the z axis, and the road surface RD. The distance H between $P_M$ and $P_3$ corresponds to a height of the gravity center position $P_M$ which will be acquired.

The following equation (18) can be derived with a moment balance around the point $P_3$.

[Math 18]

$$H \times W \sin(\theta+\theta') + L_F(N_{LF}+N_{RF}) = L_R(N_{LR}+N_{RR}) \quad (18)$$

W in the equation (18) is total weight of the vehicle 100 as described above, and sum of $N_{LF}$, $N_{RF}$, $N_{LR}$, $N_{RR}$. In the equation (18), sin (θ+θ') refers to a component of gravity along the longitudinal direction of the vehicle 100 among the gravity acting on the vehicle body 101. The value of W sin (θ+θ') can be calculated based on the signal transmitted from the acceleration sensor 180, for example. Alternatively, for example, the (θ+θ') value is acquired based on a signal from an inclination angle sensor, whereby the value of W sin (θ+θ') may be calculated.

The equation (18) is modified, whereby H indicating the height of the gravity center position $P_M$ can be expressed by the following equation (19).

[Math 19]

$$H = \frac{L_R(N_{LR} + N_{RR}) - L_F(N_{LF} + N_{RF})}{W\sin(\theta + \theta')} \quad (19)$$

With the above-described method, the estimation unit 15 is able to estimate H as a height of the gravity center $P_M$ based on $N_{LF}$, $N_{RF}$, $N_{LR}$, $N_{RR}$ acquired by the wheel load acquiring unit 14, respective values of $L_F$ and $L_R$ calculated in advance and the value of sin (θ+θ') indicating the slope of the road surface RD.

Figure 7:
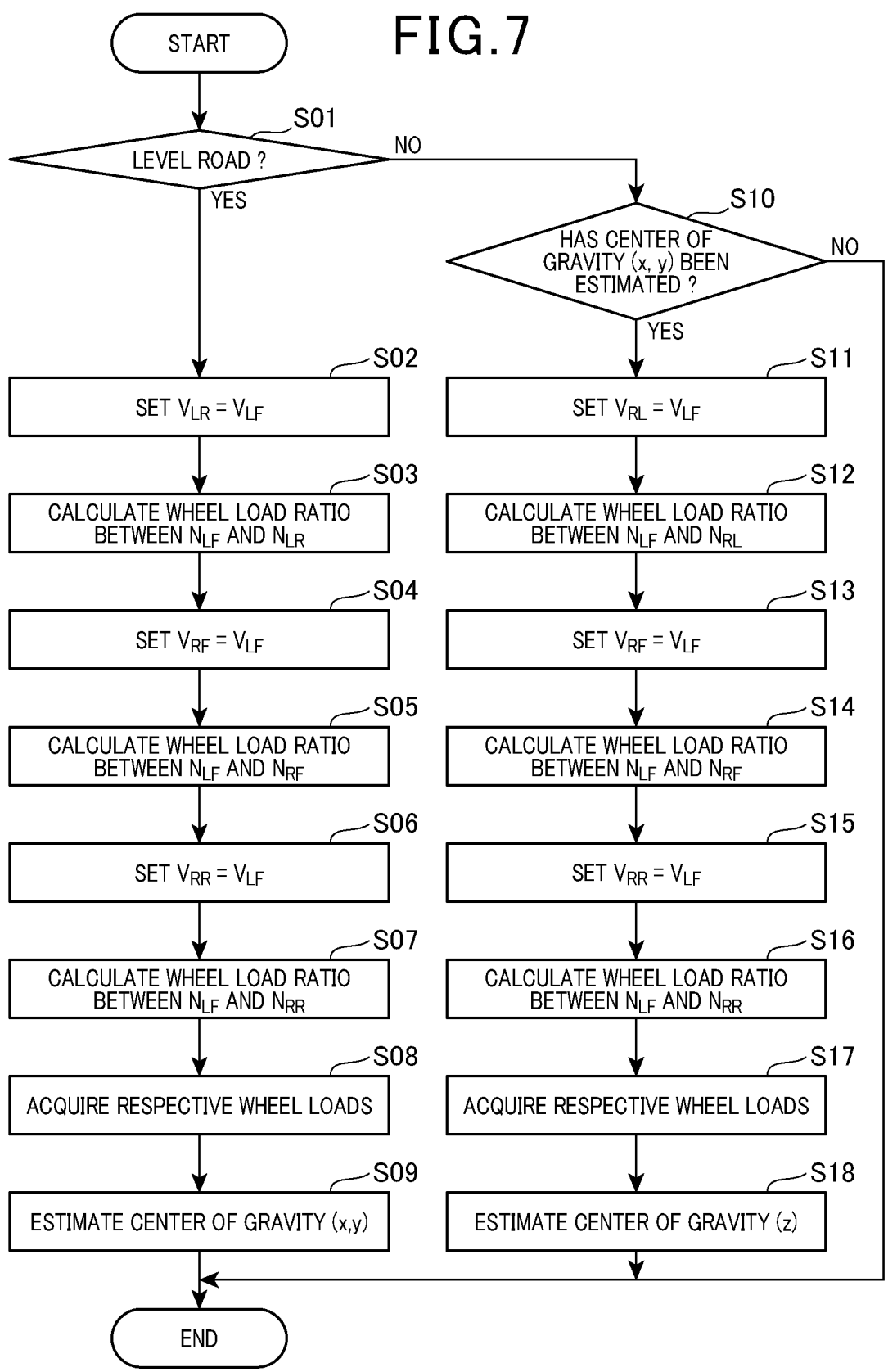
FIG. 7 is a flowchart showing processes executed by the estimation device according to the first embodiment.

With reference to FIG. 7, the specific procedure for estimating the gravity center position will be described. The series of processes shown in FIG. 7 are executed in a period where the vehicle 100 is travelling and repeatedly executed by the estimation device 10 every time when a predetermined control period elapses.

At the first step S01 in the procedure, it is determined whether the road surface on which the vehicle 100 is travelling is a level road. For example, the determination is made based on the signals from the wheel speed sensor 171 and the like and the acceleration sensor 180. In the case where the rotational speed of the wheel 141 and the like measured by the wheel speed sensor 171 and the like is constant and the acceleration in the travelling direction measured by the acceleration sensor 180 is 0, the road surface on which the vehicle 100 is travelling is determined as a level road. At step S01, the above-described determination may be made based on the signal from the inclination angle sensor.

When determined that the road surface on which the vehicle 100 is travelling is a level road, the process proceeds to step S02. The process executed at step S02 is a process executed at time t1 in an example shown in FIG. 4. Here, the selection unit 12 selects the wheel 141 as the first wheel and the wheel 143 as the second wheel. Thereafter, the braking-driving force acquiring unit 13 adjusts the rotational speed ($V_{LR}$) of the wheel 143. Specifically, the rotational speed ($V_{LR}$) of the wheel 141 and the rotational speed ($V_{LR}$) of the wheel 143 are adjusted to be mutually the same.

At step S03 next to step S02, the braking-driving force acquiring unit 13 acquires $F_{LF}$ as the first information and $F_{LR}$ as the second information. Thereafter, the wheel load accruing unit 14 calculates and acquires, based on the first information and the second information, a ratio between $N_{LF}$ and $N_{LR}$, that is, the wheel load ratio ($F_{LR}/F_{LF}$) expressed by the equation (5).

The process at step S04 next to step S03 is executed at a time t2 in an example shown in FIG. 4. In this step, the selection unit 12 selects the wheel 141 as the first wheel and selects the wheel 142 as the second wheel. Then, the braking-driving acquiring unit 13 adjusts the rotational speed ($V_{RF}$) of the wheel 142. Specifically, the rotational speed ($V_{LR}$) of the wheel 141 and the rotational speed ($V_{RF}$) of the wheel 142 are adjusted to be the same.

At step S05 next to step S04, the braking-driving force acquiring unit 13 acquires $F_{LF}$ as the first information and $F_{RF}$ as the second information. Thereafter, the wheel load accruing unit 14 calculates and acquires, based on the first information and the second information, a ratio between $N_{LF}$ and $N_{RF}$, that is, the wheel load ratio ($F_{RF}/F_{LF}$) expressed by the equation (6).

The process at step S06 next to step S05 is executed at a time t3 in an example shown in FIG. 4. In this step, the selection unit 12 selects the wheel 141 as the first wheel and selects the wheel 144 as the second wheel. Then, the braking-driving acquiring unit 13 adjusts the rotational speed ($V_{RR}$) of the wheel 144. Specifically, the rotational speed ($V_{LR}$) of the wheel 141 and the rotational speed ($V_{RR}$) of the wheel 144 are adjusted to be the same.

At step S07 next to step S06, the braking-driving force acquiring unit 13 acquires $F_{LF}$ as the first information and $F_{RR}$ as the second information. Thereafter, the wheel load accruing unit 14 calculates and acquires, based on the first information and the second information, a ratio between $N_{LF}$ and $N_{RR}$, that is, the wheel load ratio ($F_{RR}/F_{LF}$) expressed by the equation (7).

At step S08 next to step S07, with the above-described equation (9), the wheel load acquiring unit 14 acquires the wheel load values $N_{LF}$, $N_{LR}$, $N_{RF}$ and $N_{RR}$.

At step S09 next to step S08, the estimation unit 15 estimates, based on the wheel load values $N_{LF}$, $N_{LR}$, $N_{RF}$ and $N_{RR}$ calculated at step S08, x coordinate and y coordinate of the gravity center position. The estimation is performed by a method described with reference to FIG. 5. Note that, at this moment, z coordinate of the gravity center position is unknown.

At step S01, when determined that the road surface on which the vehicle 100 is travelling is not a level road, that is, a gradient road, the process proceeds to step S10. At step S10, the process determines whether an estimation of the x coordinate and y coordinate of the gravity center is completed. In the case where no execution history of the process at step S09 is present in the past control periods, the determination at step S10 is No and the series of processes shown in FIG. 7 are terminated. This is because, the above-described respective values of $L_F$ and $L_R$ are necessary for estimating the height of the gravity center position.

In the case where an execution history of the process at step S09 is present in the past control periods, the determination at step S10 is Yes and the process proceeds to step S11. The processes from step S11 to step S17 are the same as those executed at steps S02 to S08. Hence, the detailed explanation is omitted.

At step S18 next to step S17, the estimation device 15 estimates, based on the wheel load values $N_{LF}$, $N_{LR}$, $N_{RF}$ and $N_{RR}$ calculated at step S17, z coordinate of the gravity center position. The estimation is performed by a method described with reference to FIG. 6.

With the above-described processes, the estimation device 10 is able to estimate x coordinate, y coordinate and z coordinate of the gravity center position. The gravity center position estimated by the estimation unit is utilized for a control for maintaining the stability of a travelling posture of the vehicle 100. Further, since the process shown in FIG. 7 is repeatedly executed, even when the gravity center position is changed, the estimation device 10 is able to always estimate the latest gravity center.

As described above, according to the estimation device 10 of the present embodiment, the braking-driving force acquiring unit 13 acquires the braking-driving force information based on the signals from the in-wheel sensor 181 and the like which detect the force. Thereafter, the wheel loads of the respective wheels are acquired based on the braking-driving information, and the gravity center of the vehicle 100 is estimated. Since the braking-driving force information is acquired as actual measurement value not the control value based on the signals from the in-wheel sensor 181 and the like, the gravity center position of the vehicle 100 is accurately estimated based on the braking-driving force information.

As the sensors for acquiring the braking-driving information, according to the present embodiment, the in-wheel-sensors 181 and the like attached to the wheels are used. With such a configuration, like the present embodiment, the braking-driving force acting on the wheels 141 and the like can be always acquired even for a configuration which the torque of the wheel 141 is adjusted by operation of the braking unit 151 and the like.

According to the estimation device 10 of the present embodiment, the braking-driving acquiring unit 13 acquires the first information as the braking-driving force information of the first wheel and the second information as the braking-driving force information of the second wheel for each of a plurality of combinations of the wheels selected as the first wheel and the second wheel, in a state where the rotational speed of the first wheel and the rotational speed of the second wheel are adjusted to be the same. The wheel load acquiring unit 14 calculates the wheel load ratio as a ratio between the wheel load acting on the first wheel and the wheel load acting on the second wheel based on the acquired first information and the second information. Further, the wheel load acquiring unit 14 acquires the wheel load of each wheel included in the vehicle 100 based on the wheel load ratio calculated for each combination of the first wheel and the second wheel. With such a process, respective values of the wheel load $N_{LF}$, $N_{LR}$, $N_{RF}$ and $N_{RR}$ can be accurately acquired.

As described with reference to FIG. 6 or the like, the estimation device 15 estimates the height H of the gravity center position of the vehicle 100 with respect to the road surface RD based on the slope of the road surface on which the vehicle 100 is travelling. Thus, not only x, y coordinates of the gravity center position but also z coordinate of the gravity center position can be estimated.

A second embodiment will be described. In the following, configurations different from those in the first embodiment will mainly be described, and explanation will be appropriately omitted for configuration same as those in the first embodiment.

Figure 8:
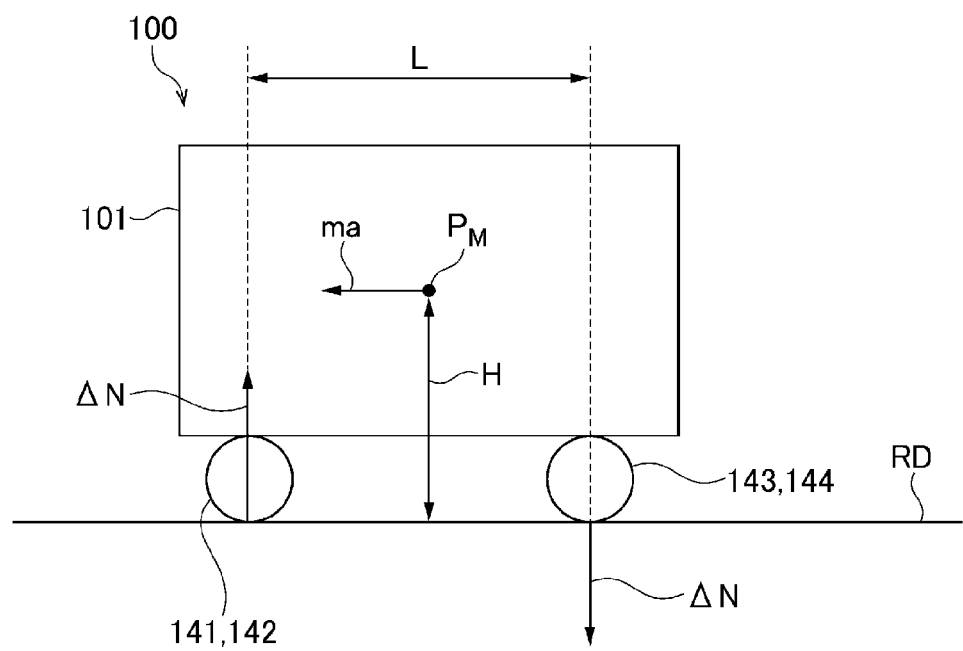
FIG. 8 is a diagram explaining an estimation method of the gravity center position based on the wheel load according to a second embodiment.

According to the present embodiment, contents of processes for estimating the height of the gravity center position are different from those in the first embodiment. With reference to FIG. 8, an estimation method of the gravity center position according to the present embodiment will be described. In FIG. 8, similar to FIG. 6, the gravity center position of the vehicle 100 is labelled as $P_M$, and the height of the gravity center position $P_M$ with respect to the road surface RD is labelled as H. L shown in FIG. 8 refers to ($L_F+L_R$), that is, a distance between the front wheel and the rear wheel of the vehicle 100 along the longitudinal direction of the vehicle 100. L is a known value as one of the specifications of the vehicle 100.

In the estimation device 10 according to the present embodiment, while the vehicle 100 travels straight and accelerates or decelerate at a constant acceleration factor, the braking-driving force acquiring unit 13 acquires the braking-driving force, the wheel load acquiring unit 14 acquires the wheel load, and the estimation unit 15 estimates the height H. Note that the road surface RD on which the vehicle 100 travels may be a level road or a gradient road as an uphill road or a downhill road. m shown in FIG. 8 is a total weight of the vehicle 100. a shown in FIG. 8 is a constant acceleration factor, that is, an acceleration factor along the longitudinal direction of the vehicle 100. The value a can be acquired as an acceleration factor along the longitudinal direction of the vehicle 100 among the acceleration factors detected by the acceleration sensor 180.

For estimating the height H, the wheel load values acted on the wheels 141, 142, 143 and 144 are required to be acquired at a time when the acceleration factor in the longitudinal direction of the vehicle 100 is 0. Since a method for acquiring the wheel load values of the wheel 141 and the like at a time when the acceleration factor in the longitudinal direction of the vehicle 100 is 0, is the same as the method described with reference to FIG. 5 in the first embodiment, the explanation thereof is omitted here.

ΔN shown in FIG. 8 is an amount of variation of the wheel load acted on the wheel 141 and the like when the acceleration factor of the vehicle 100 changes to a from 0. In FIG. 8, it is shown that the total value of the wheel loads acted on the front side wheels 141 and 142 increases by ΔN, and the total value of the wheel loads acted on the rear side wheels 143 and 144 decreases by ΔN.

The following equation (20) can be derived with a moment balance between 3 forces acted on the vehicle 100, that is, ma, ΔN and −ΔN.

[Math 20]

$$\Delta N = ma \frac{H}{L} \quad (20)$$

The equation (20) is solved to derive H, whereby the estimation value of the height H can be obtained. Note that, in an example of FIG. 8, the vehicle 100 accelerates forward at an acceleration factor a, but the same applies to a case where the vehicle 100 decelerates reverse at an acceleration factor a. In the case where the vehicle 100 decelerates, the directions of ma and ΔN are opposite to the directions shown in FIG. 8, but the H value can be obtained using the equation (20) as described above.

The estimation of H with the above-described method may be changed to the estimation of H in the method of the first embodiment, but the estimation of H may be accomplished in addition to the estimation of H in the method of the first embodiment. In other words, in the series of processes shown in FIG. 7, the processes from step S10 to S18 may not be performed according to the present embodiment, but may be performed. In the latter case, the process for estimating the height H is executed for respective cases where the vehicle 100 is stationary on the gradient road as shown in FIG. 6 and the vehicle 100 is travelling at a constant acceleration factor as shown in FIG. 8.

Figure 9:
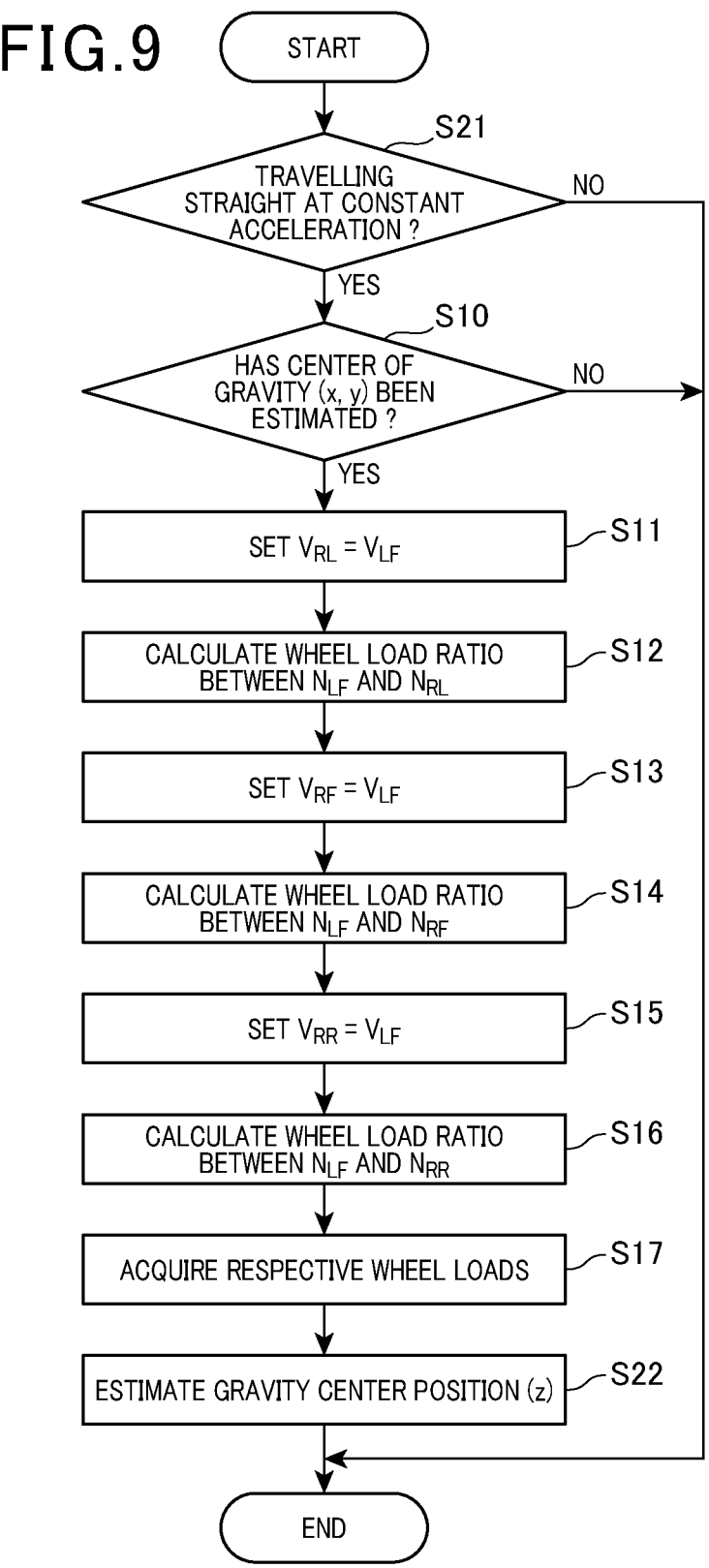
FIG. 9 is a flowchart showing processes executed by the estimation device according to a third embodiment.

The specific processes executed for estimating the height H will be described with reference to FIG. 9. The series of processes shown in FIG. 9 is repeatedly executed by the estimation device 10 every time when a predetermined control period elapses. These series of processes are executed in parallel to the series of processes shown in FIG. 5.

At step S21 in the processes, it is determined whether the vehicle 100 is travelling straight at a constant acceleration factor. This determination is performed based on the signal from the acceleration sensor 180. When the vehicle 100 is travelling straight at a constant acceleration factor, the process proceeds to step S10, otherwise the series of processes shown in FIG. 9 are terminated.

The processes executed at steps S10 to S17 shown in FIG. 9 are the same as the processes executed at steps S10 to S17 shown in FIG. 7. At step S18 next to step S17, the value of ΔN shown in FIG. 8 is calculated based on the respective values of the wheel load $N_{LF}$, $N_{LR}$, $N_{RF}$ and $N_{RR}$ calculated at step S17. Thereafter, an estimation value of the height H of the gravity center is calculated based on value of ΔN and the above-described equation (20).

Thus, according to the estimation device 10 of the present embodiment, the height H of the gravity center position of the vehicle 100 with respect to the road surface RD is estimated based on the acceleration factor a of the vehicle 100. With this method, z coordinate of the gravity center position along the road surface is calculated and the effects similar to those in the first embodiment can be obtained.

A third embodiment will be described. In the following, configurations different from those in the first embodiment will mainly be described, and explanation will be appropriately omitted for configuration same as those in the first embodiment.

Figure 10:
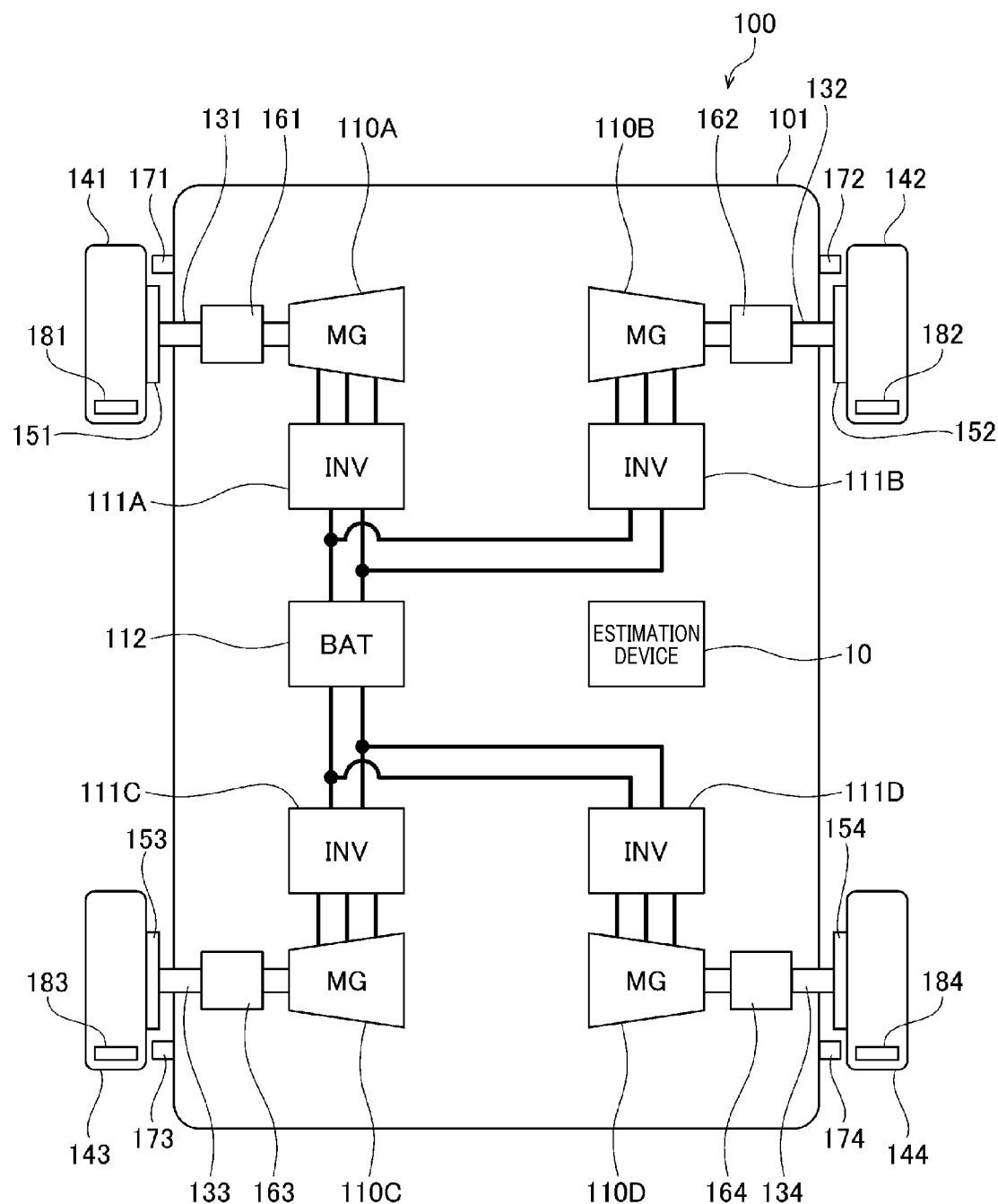
FIG. 10 is a diagram schematically showing a configuration of a vehicle on which the estimation device according to the third embodiment is mounted.

As shown in FIG. 10, the vehicle 100 according to the present embodiment is provided with four motor generators 110A, 110B, 110C and 110D, and four inverters 111A, 111B, 111C and 111D.

The motor generator 110A is a rotational electric machine dedicated for generating the driving force of the wheel 141. The inverter 111A is a power converter dedicated for adjusting the power supplied to the motor generator 110A.

The motor generator 110B is a rotational electric machine dedicated for generating the driving force of the wheel 142. The inverter 111B is a power converter dedicated for adjusting the power supplied to the motor generator 110B.

The motor generator 110C is a rotational electric machine dedicated for generating the driving force of the wheel 143. The inverter 111C is a power converter dedicated for adjusting the power supplied to the motor generator 110C.

The motor generator 110D is a rotational electric machine dedicated for generating the driving force of the wheel 144. The inverter 111D is a power converter dedicated for adjusting the power supplied to the motor generator 110D.

Operations of the inverters 111A, 111B, 111C and 111D are controlled by the estimation device 10. With this configuration, the estimation device 10 according to the present embodiment is able to individually adjust respective driving force applied to the wheels 141, 142, 143 and 144

A torque sensor 161 is provided at a portion in the middle of the drive shaft 131 connected to the wheel 141. The torque sensor 161 measures an amount of the torque applied to the wheel 141 based on an amount of deformation of the drive shaft 131 in the twist direction.

Similarly, a torque sensor 162 is provided at a portion in the middle of the drive shaft 132 connected to the wheel 142. A torque sensor 163 is provided at a portion in the middle of the drive shaft 133 connected to the wheel 143. A torque sensor 164 is provided at a portion in the middle of the drive shaft 134 connected to the wheel 144.

Figure 11:
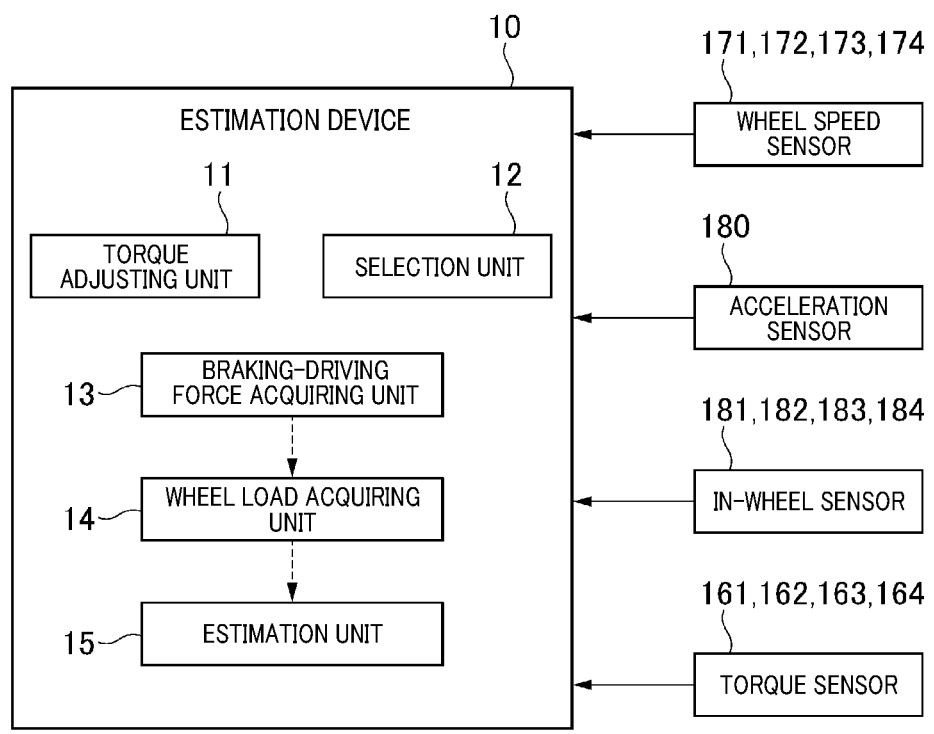
FIG. 11 is a diagram schematically showing a configuration of the estimation device according to the third embodiment.

As shown in FIG. 11, signals indicating the torque of respective wheels measured by the torque sensors 161, 162, 163 and 164 are transmitted to the estimation device 10. The estimation device 10 according to the present embodiment is capable of acquiring the braking force or the driving force applied to the wheel 141 and the like. The information indicated by the signals transmitted to the estimation device 10 from the torque sensor 161 and the like corresponds to braking-driving force information of the present embodiment similar to the information indicated by the signals transmitted from the in-wheel sensors 181 and the like.

Thus, the sensors that detect force to obtain the braking-driving force information may be attached to a member (drive shaft 131 or the like according to the present embodiment) that transmits the driving force to the wheel 141 and the like.

The estimation device 10 according to the present embodiment also performs processes similar to those in the first embodiment, thereby estimating the gravity center of the vehicle 100. According to the present embodiment, the driving force of the motor generator 110A and the like are individually adjusted, whereby the rotational speed of the first wheel and the rotational speed of the second wheel can be the same.

Also, the braking-driving force acquiring unit 13 according to the present embodiment is able to acquire the braking-driving force information based on the signals from the torque sensor 161 and the like. In the case where either one of the torque sensor 161 and the like or the in-wheel sensors 181 and the like is sufficient to acquire the braking-driving force information, the other sensors are not necessarily provided. Note that, the torque value measured by the torque sensor 161 is referred to as $T_{LF}$, the value of $F_{LF}$ indicated in the equation (4) or the like can be calculated by dividing the $T_{LF}$ value with the radius of the wheel 141. The same applies to the values of $F_{LR}$, $F_{RF}$ and $F_{RR}$.

Thus, also in the vehicle 100 in which the driving forces of four wheels can be individually adjusted, the gravity center of the vehicle 100 can be estimated with the method similar to that of the first embodiment.

A fourth embodiment will be described. In the following, configurations different from those in the first embodiment will mainly be described, and explanation will be appropriately omitted for configuration same as those in the first embodiment.

Figure 12:
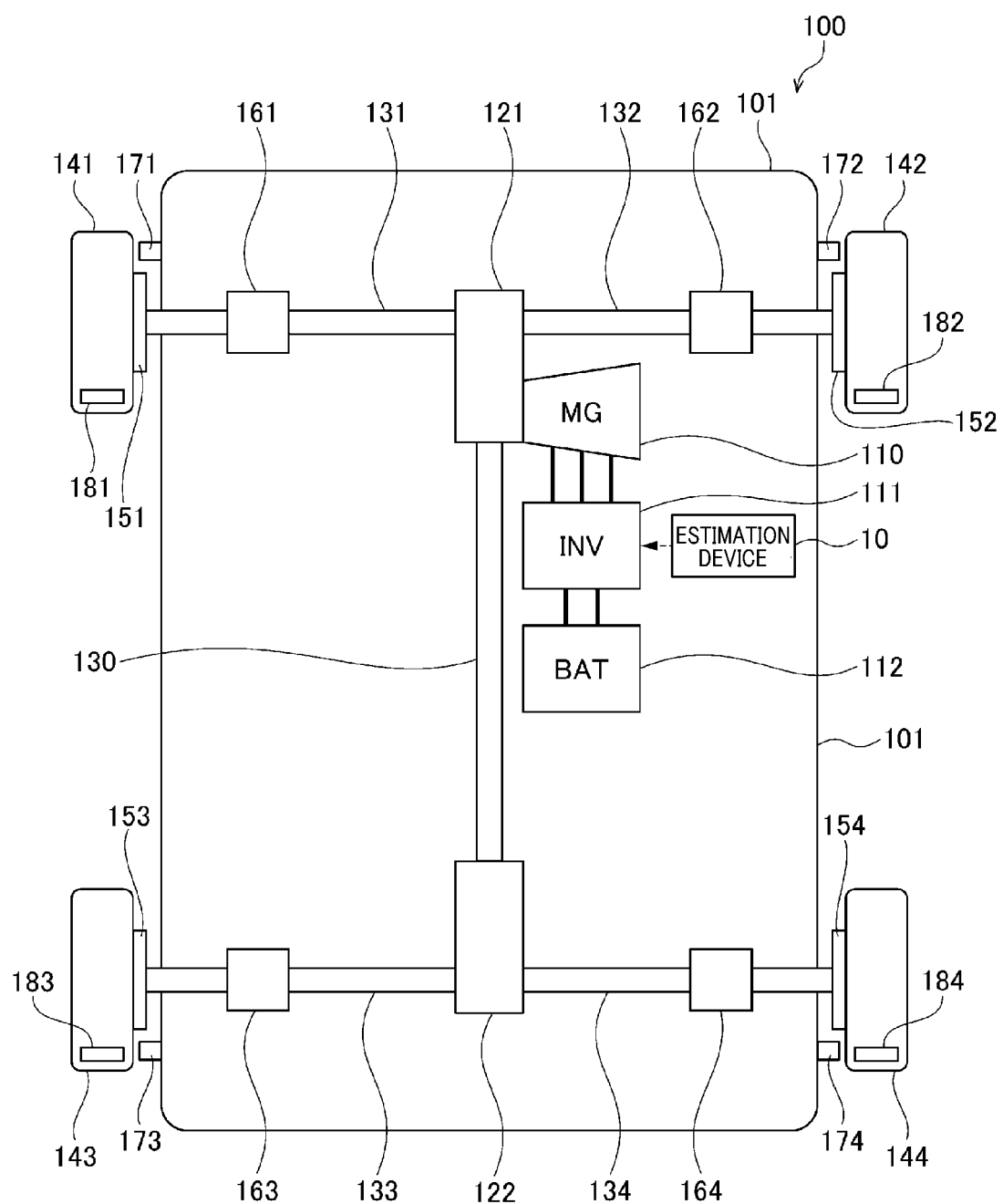
FIG. 12 is a diagram schematically showing a configuration of a vehicle on which an estimation device according to a fourth embodiment is mounted.

As shown in FIG. 12, the configuration of the vehicle 100 according to the present embodiment is substantially the sane as that of the first embodiment. In an example shown in FIG. 12, the torque sensors 161, 162, 163 and 164 similar to those in the third embodiment are provided on the drive shaft 131 and the like, and the braking-driving information can be acquired based on the signals from these sensors. As a sensor for acquiring the braking-driving force information, in the case where either one of the torque sensor 161 and the like or the in-wheel sensors 181 and the like is sufficient, the other sensors are not necessarily provided.

Figure 13:
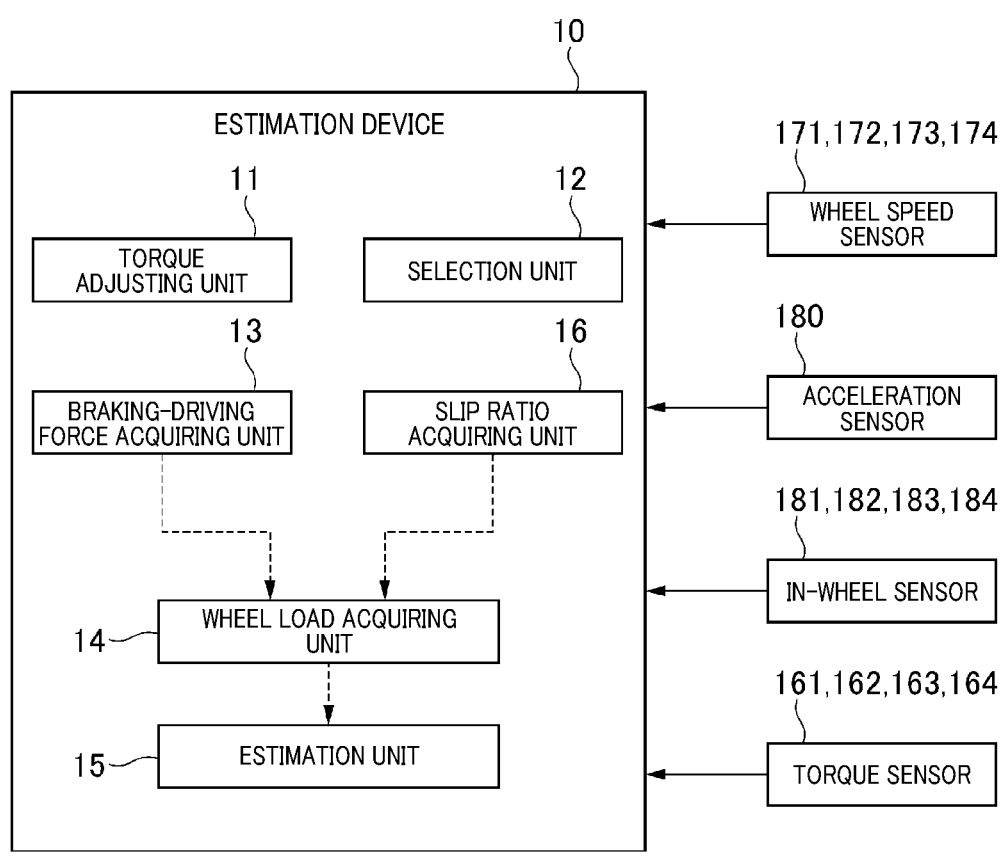
FIG. 13 is a diagram schematically showing the configuration of the estimation device according to the fourth embodiment.

As shown in FIG. 13, the estimation device 10 according to the present embodiment is further provided with a slip ratio acquiring unit 16 as a block element representing the function thereof. The slip ratio acquiring unit 16 performs a process for acquiring the slip ratio of the vehicle 100, that is, respective slip ratios of the wheels 141, 142, 143 and 144.

The slip ratio acquiring unit 16 uses the rotational speed of the wheel 141 measured by the wheel speed sensor 171 and the above-described equation (1), thereby acquiring the slip ratio. The vehicle speed V in the equation (1) can be calculated in accordance with an average value of respective rotational speeds of the wheels 141, 142, 143 and 144, for example. The slip ratio acquiring unit 16 calculates, with the above-described similar method, the slip ratios of the wheels 142, 143 and 144.

The wheel load acquiring unit 14 according to the present embodiment is configured to acquire the wheel load based on both the braking-driving force information acquired by the braking-driving force acquiring unit 13 and the slip ratio acquired by the slip ratio acquiring unit 16. In the followings, such an acquiring method for the wheel load will be described.

In the equation (2), when replacing $\mu L_F$ to $F_{LF}/N_{LF}$, replacing $\mu_{RF}$ to $F_{RF}/N_{RF}$ and replacing $\mu_{RR}$ to $F_{RR}/N_{RR}$, the following equation (21) can be obtained.

[Math 21]

$$\frac{F_{LF}}{N_{LF}S_{LF}} = \frac{F_{LR}}{N_{LR}S_{LR}} = \frac{F_{RF}}{N_{RF}S_{RF}} = \frac{F_{RR}}{N_{RR}S_{RR}} \tag{21}$$

Further, the equation (21) is modified, thereby acquiring the equations (22), (23), and (24).

[Math 22]

$$N_{LR} = \frac{F_{LR}S_{LF}}{F_{LF}S_{LR}}N_{LF} \tag{22}$$

[Math 23]

$$N_{RF} = \frac{F_{RF}S_{LF}}{F_{LF}S_{RF}}N_{LF} \tag{23}$$

[Math 24]

$$N_{RR} = \frac{F_{RR}S_{LF}}{F_{LF}S_{RR}}N_{LF} \tag{24}$$

Similar to the equation (5), the equation (22) expresses a relationship between $N_{LF}$ and $N_{LR}$. The coefficient $F_{LR}S_{LF}/F_{LF}S_{LR}$ of $N_{LF}$ in the right side of the equation (22) is a ratio between the wheel load $N_{LF}$ received by the wheel 141 and the wheel load $N_{LR}$ received by the wheel 143, that is, wheel load ratio.

The values of $F_{LF}$ and $F_{LR}$ can be directly acquired based on the braking-driving information of the in-wheel sensor 181 and 183, or the torque sensors 161 and 163, respectively. Further, the values of $S_{LF}$ and $S_{LR}$ are acquired by the slip ratio acquiring unit 16 based on the measurement values of the wheel speed sensors 171 and 173. Hence, the wheel load ratio in this example, that is, values of $F_{LR}S_{LF}/F_{LF}S_{LR}$ are known values which can be acquired based on the braking-driving force information and the slip ratio.

The equation (23) expresses, similar to that of the equation (6), a relationship between $N_{LF}$ and $N_{RF}$. The coefficient $F_{RF}S_{LF}/F_{LF}S_{RF}$ of $N_{LF}$ in the right side of the equation (23) is a ratio between the wheel load $N_{LF}$ received by the wheel 141 and the wheel load $N_{RF}$ received by the wheel 142, that is, wheel load ratio.

The values of $F_{LF}$ and $F_{LR}$ can be directly acquired based on the braking-driving information of the in-wheel sensor 181 and 182, or the torque sensors 161 and 162, respectively. Further, the values of $S_{LF}$ and $S_{LR}$ are acquired by the slip ratio acquiring unit 16 based on the measurement values of the wheel speed sensors 171 and 172. Hence, the wheel load ratio in this example, that is, values of $F_{RF}S_{LF}/F_{LF}S_{RF}$ are known values which can be acquired based on the braking-driving force information and the slip ratio.

The equation (24) expresses, similar to that of the equation (7), a relationship between $N_{LF}$ and $N_{RF}$. The coefficient $F_{RR}S_{LF}/F_{LF}S_{RR}$ of $N_{LF}$ in the right side of the equation (24) is a ratio between the wheel load $N_{LF}$ received by the wheel 141 and the wheel load $N_{RR}$ received by the wheel 144, that is, wheel load ratio.

The values of $F_{LF}$ and $F_{RR}$ can be directly acquired based on the braking-driving information of the in-wheel sensor 181 and 184, or the torque sensors 161 and 164, respectively. Further, the values of $S_{LF}$ and $S_{RR}$ are acquired by the slip ratio acquiring unit 16 based on the measurement values of the wheel speed sensors 171 and 174. Hence, the wheel load ratio in this example, that is, values of $F_{RR}S_{LF}/F_{LF}S_{RR}$ are known values which can be acquired based on the braking-driving force information and the slip ratio.

The equation (8) can be modified to be the following equation (25) using the equations (22), (23) and (24).

[Math 25]

$$\left(1 + \frac{F_{LR}S_{LF}}{F_{LF}S_{LR}} + \frac{F_{RF}S_{LF}}{F_{LF}S_{RF}} + \frac{F_{RR}S_{LF}}{F_{LF}S_{RR}}\right)N_{LF} = W \tag{25}$$

In the equation (25), values other than $N_{LF}$ are all known values. Hence, with the equation (25), $N_{LF}$ value can be calculated. Further, when using the calculated $N_{LF}$ value, respective value of $N_{LR}$, $N_{RF}$ and $N_{RR}$ can be calculated with the equations (22), (23) and (24). The wheel load acquiring unit 14 performs the above-described processes, whereby the respective values of $N_{LF}$, $N_{LR}$, $N_{RF}$ and $N_{RR}$ as the wheel loads of respective wheels are calculated and acquired.

In the above-described processes, unlike the first embodiment, processes for selecting the first wheel and the second wheel, and processes for making the rotational speeds of the first wheel and the second wheel to be the same are unnecessary. Hence, according to the present embodiment, the wheel load ratios indicated by the equations (22), (23) and (24) are acquired at the same timing.

Figure 14:
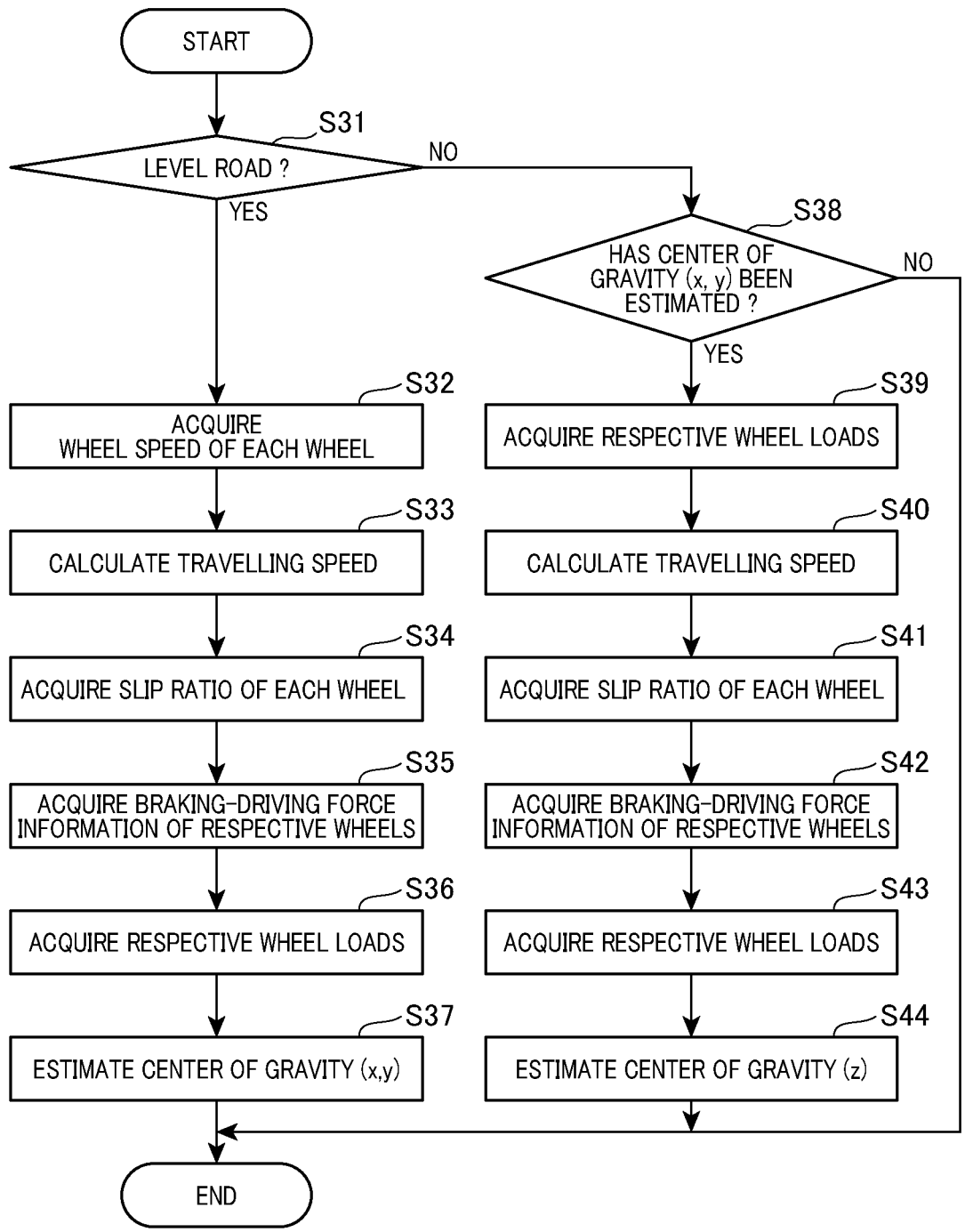
FIG. 14 is a flowchart showing processes executed by the estimation device according to the fourth embodiment.

The specific processes executed for estimating the gravity center position will be described with reference to FIG. 14. The series of processes shown in FIG. 14 are executed in a period where the vehicle 100 is travelling, and repeatedly executed by the estimation device 10 instead of the series of processes shown in FIG. 7.

At the first step S31 of the processes, it is determined whether the road surface on which the vehicle 100 is travelling is a level road. This process is the same as the process executed at step S101 shown in FIG. 7. When determined that the road surface on which the vehicle 100 is travelling is a level road, the process proceeds to step S32.

At step S32, respective rotational speeds of the wheel 141 and the like included in the vehicle 100 are acquired. This process is executed based on the signals from the wheel speed sensors 171 and the like.

At step S33 next to step S32, a process for calculating the vehicle speed of the vehicle 100 is executed based on an average value of respective rotational speeds of the wheels 141, 142, 143 and 144.

At step S34 next to step S33, the slip ratio acquiring unit 16 individually calculates and acquires respective slip ratios ($S_{LF}$, $S_{LR}$, $S_{RF}$, $S_{RR}$) of the wheel 141 and the like. The calculation step of the slip ratio is already described with reference to the equation (1).

At step S35 next to step S34, the braking-driving force acquiring unit 13 acquires the braking-driving force information for respective wheels 141, 142, 143 and 144. According to the present embodiment, respective values of $F_{LF}$, $F_{LR}$, $F_{RF}$, $F_{RR}$ as the braking-driving information are acquired based on the signals from the in-wheel sensor 181 and the like, or the torque sensor 161 and the like.

At step S36 next to step S35, with the above-described equation (25) or the like, the wheel load acquiring unit 14 acquires respective wheel load values $N_{LF}$, $N_{LR}$, $N_{RF}$ and $N_{RR}$.

At step S37 next to step S36, the estimation device 15 estimates the x coordinate and the y coordinate values of the gravity center position based on the respective wheel load values $N_{LF}$, $N_{LR}$, $N_{RF}$, and $N_{RR}$ calculated at step S36. The estimation is performed with a method same as that described with reference to FIG. 5. Note that the z coordinate value of the gravity center position is unknown at the moment.

At step S31, when the road surface on which the vehicle 100 is travelling is not a level road, that is, when determined that the road surface is a gradient road, the process proceeds to step S38. At step S38, the process determines whether the estimation of the x coordinates and the y coordinate of the gravity center position has been completed. In the case where no execution history of the process at step S37 is present in the past control periods, the determination at step S38 is No and the series of processes shown in FIG. 14 are terminated.

In the case where an execution history of the process at step S37 is present in the past control periods, the determination at step S38 is Yes and the process proceeds to step S39. The processes from steps S39 to S43 are the same as processes executed at steps S32 to S36. Hence, the detailed explanation will be omitted.

At step S37 next to step S36, the estimation device 15 estimates the z coordinate value of the gravity center position based on the respective wheel load values $N_{LF}$, $N_{LR}$, $N_{RF}$, and $N_{RR}$ calculated at step S43. The estimation is performed with a method that is the same as that described with reference to FIG. 6.

As described, according to the estimation device 10 of the present embodiment, the wheel load acquiring unit 14 is configured to acquire the wheel load based on the braking-driving force information and the slip ratio. In such a configuration, since a process for making the slip ratios of the pair of wheels to be the same, that is, a process for making the rotational speeds of the first wheel and the second wheel is not necessary, the gravity center position of the vehicle 100 can be promptly estimated.

A fifth embodiment will be described. In the following, configurations different from those in the fourth embodiment will mainly be described, and explanation will be appropriately omitted for configuration same as those in the fourth embodiment.

According to the present embodiment, contents of processes for estimating the height of the gravity center position are different from those in the fourth embodiment. The estimation method of the gravity center position of the present embodiment is the same as that of the second embodiment which is described with reference to FIG. 8.

Figure 15:
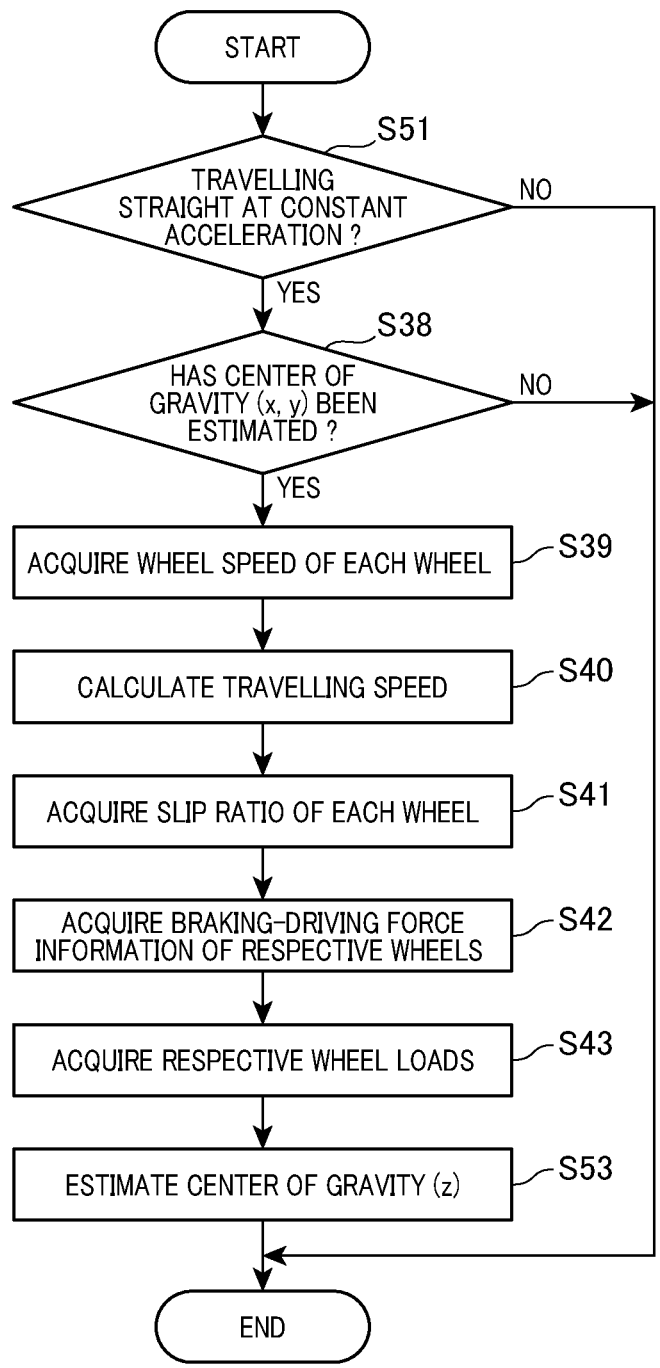
FIG. 15 is a flowchart showing processes executed by an estimation device according to a fifth embodiment.

The specific processes executed for estimating the height H of the gravity center position will be described with reference to FIG. 15. The series of processes shown in FIG. 15 is repeatedly executed by the estimation device 10 every time when a predetermined control period elapses. These series of processes are executed in parallel to the series of processes shown in FIG. 14.

At step S51 as a first step of the processes, the process determines whether the vehicle 100 is travelling straight at a constant acceleration factor. The process is the same as that executed at step S21. When the vehicle 100 is travelling straight at a constant acceleration factor, the process proceeds to step S38. Otherwise, the series of processes shown in FIG. 15 is terminated.

The processes executed at steps from S38 to S43 are the same as the processes executed at steps from S38 to S43. At step S44 next to step S43, the ΔN value shown in FIG. 8 is calculated based on respective values of the wheel load $N_{LF}$, $N_{LR}$, $N_{RF}$, $N_{RR}$. Thereafter, the process calculates the estimation value of the height H of the gravity center position based on the above-described equation (20).

Thus, according to the estimation device 10 of the present embodiment, the height H of the gravity center position of the vehicle 100 from the road surface RD is estimated based on the acceleration factor a of the vehicle 100. With this method, the z coordinate of the gravity center position along the road surface can be calculated and effects and advantages similar to those of the fifth embodiment can be obtained.

As described, the present embodiment is described with reference to specific examples. However, the present disclosure is not limited to these specific examples. For these specific examples, a person of ordinary skill in the art appropriately may appropriately modify the design thereof. These modified designs are included in the scope of the present disclosure as long as features of the present disclosure are provided therein. Further, respective elements included in the above-described specific examples, an arrangement, conditions and shapes thereof are not limited to the above-exemplified elements and may be appropriately modified. The respective elements in the above-described specific examples may be appropriately combined as long as no technical inconsistency is present.

The control unit and method thereof disclosed in the present disclosure may be accomplished by one or more dedicated computers constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computers where a processor and a memory programmed to execute one or more functions, and a processor configured including one or more hardware logic circuits are combined. Furthermore, the computer programs may be stored, as instruction codes executed by the computer, into a computer readable non-transitory tangible recording media. The dedicated hardware circuits and the hardware circuits may be accomplished by a digital circuit including a plurality of logic circuit, or an analog circuit.

(Conclusion)

An estimation device according to the present disclosure estimates a gravity center position of a vehicle. The estimation device includes a braking-driving force acquiring unit that acquires, based on a signal from a sensor that detects a force, braking-driving force information as information indicating a braking force or a driving force applied to wheels of the vehicle; a wheel load acquiring unit that acquires, based on the braking-driving force information, a wheel load received by the wheels from a road surface; and an estimation unit that estimates, based on a value of the wheel load of each wheel included in the vehicle, a gravity center position of the vehicle.

According to such an estimation device, the braking-driving force information as information indicating the braking force or the driving force applied to the wheel of the vehicle is acquired based on the signal from a sensor that detects force. Since the braking-driving force information as an actual measurement data not the control value is acquired, the gravity center position of the vehicle can be accurately estimated based on the braking-driving force information.

According to the present disclosure, an estimation device capable of accurately estimating the gravity center position of the vehicle is provided.

What is claimed is:

1. An estimation device that estimates a gravity center position of a vehicle, comprising:
    a selection unit that performs a selection process for selecting a first wheel and a second wheel among a plurality of the wheels included in the vehicle;
    a braking-driving force acquiring unit that:
        acquires, based on a signal from a sensor that detects a force, braking-driving force information as information indicating a braking force or a driving force applied to wheels of the vehicle, and
        acquires first information as the braking-driving force information of the first wheel and second information as the braking-driving force information of the second wheel for each of a plurality of combinations of the wheels selected as the first wheel and the second wheel, in a state where a rotational speed of the first wheel and a rotational speed of the second wheel are adjusted to be the same;
    a wheel load acquiring unit that:
        acquires, based on the braking-driving force information, a wheel load received by the wheels from a road surface, and
        calculates a wheel load ratio as a ratio between the wheel load acting on the first wheel and the wheel load acting on the second wheel based on the first information and the second information, and acquires the wheel load of each wheel included in the vehicle based on the wheel load ratio calculated for each combination of the first wheel and the second wheel; and
    an estimation unit that estimates, based on a value of the wheel load of each wheel included in the vehicle, a gravity center position of the vehicle,
    wherein the estimation unit, or a processor separate from the estimation unit and operably connected to the estimation unit, is configured to control travelling of the vehicle based on the estimated gravity center position of the vehicle.

2. The estimation device according to claim 1, wherein the sensor is attached to the wheels.

3. The estimation device according to claim 1, wherein the sensor is attached to a member that transmits a driving force to the wheels.

4. The estimation device according to claim 1, wherein the estimation device further comprises a slip ratio acquiring unit that acquires a slip ratio of the vehicle; and the wheel load acquiring unit acquires the wheel load based on the braking-driving force information and the slip ratio.

5. The estimation device according to claim 1, wherein the estimation unit estimates a height of the gravity center position of the vehicle with respect to the road surface based on a slope of a road surface on which the vehicle is travelling or an acceleration factor of the vehicle.

6. A system comprising:
    at least one processor programmed to:
        perform a selection process for selecting a first wheel and a second wheel among a plurality of the wheels included in a vehicle;
        acquire, based on a signal from a sensor that detects a force, braking-driving force information as information indicating a braking force or a driving force applied to wheels of the vehicle;
        acquire first information as the braking-driving force information of the first wheel and second information as the braking-driving force information of the second wheel for each of a plurality of combinations of the wheels selected as the first wheel and the second wheel, in a state where a rotational speed of the first wheel and a rotational speed of the second wheel are adjusted to be the same;

acquire, based on the braking-driving force information, a wheel load received by the wheels from a road surface;

calculate a wheel load ratio as a ratio between the wheel load acting on the first wheel and the wheel load acting on the second wheel based on the first information and the second information, and acquire the wheel load of each wheel included in the vehicle based on the wheel load ratio calculated for each combination of the first wheel and the second wheel;

estimate, based on a value of the wheel load of each wheel included in the vehicle, a gravity center position of the vehicle; and control travelling of the vehicle based on the estimated gravity center position of the vehicle.

7. The system according to claim 6, wherein the sensor is attached to the wheels.

8. The system according to claim 6, wherein the sensor is attached to a member that transmits a driving force to the wheels.

9. The system according to claim 6, wherein the at least one processor further is further programmed to acquire a slip ratio of the vehicle; and the at least one processor acquires the wheel load based on the braking-driving force information and the slip ratio.

10. The system according to claim 6, wherein the at least one processor estimates a height of the gravity center position of the vehicle with respect to the road surface based on a slope of a road surface on which the vehicle is travelling or an acceleration factor of the vehicle.

* * * * *